United States Patent
Gao et al.

(10) Patent No.: US 6,508,553 B2
(45) Date of Patent: *Jan. 21, 2003

(54) INTERACTIVE EYEWEAR SELECTION SYSTEM

(75) Inventors: Feng Gao; Wei Li, both of Manlius, NY (US)

(73) Assignee: Virtual Visual Devices, LLC, Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/854,861

(22) Filed: May 14, 2001

(65) Prior Publication Data

US 2001/0026351 A1 Oct. 4, 2001

Related U.S. Application Data

(63) Continuation of application No. 09/629,763, filed on Jul. 31, 2000, now Pat. No. 6,231,188, which is a continuation of application No. 09/158,480, filed on Sep. 22, 1998, now Pat. No. 6,095,650.

(51) Int. Cl.[7] .............................................. A61B 3/04
(52) U.S. Cl. ...................................................... 351/227
(58) Field of Search ............................... 351/204, 205, 351/207, 227, 177, 178, 160 R, 247; 33/200, 507; 382/117, 275, 276; 396/18; 705/26, 27

(56) References Cited

U.S. PATENT DOCUMENTS

| | | |
|---|---|---|
| 4,539,585 A | 9/1985 | Spackova et al. ............. 358/93 |
| 4,823,285 A | 4/1989 | Blancato ...................... 364/521 |
| 4,845,641 A | 7/1989 | Ninomiya et al. ........... 364/518 |
| 4,852,184 A | 7/1989 | Tamura et al. ................ 382/48 |
| 4,991,005 A | 2/1991 | Smith .......................... 358/93 |
| 5,280,570 A | 1/1994 | Jordan ......................... 395/135 |
| 5,576,778 A | 11/1996 | Fujie et al. .................. 351/177 |
| 5,585,874 A | 12/1996 | Wickes ........................ 351/233 |
| 5,592,248 A | 1/1997 | Norton et al. ............... 351/246 |
| 5,598,223 A | 1/1997 | Leroux et al. ............... 348/589 |
| 5,617,155 A | 4/1997 | Ducarouge et al. ......... 351/204 |
| 5,717,454 A | 2/1998 | Adolphi et al. ............... 348/61 |
| 4,730,260 A | 3/1998 | Mori et al. .................. 365/518 |
| 5,875,017 A | 2/1999 | Ohnuma et al. ............. 351/205 |
| 5,983,201 A | * 11/1999 | Fay .............................. 705/27 |
| 6,088,470 A | 7/2000 | Camus et al. ............... 382/117 |
| 6,142,628 A | * 11/2000 | Saigo ........................... 351/204 |

* cited by examiner

Primary Examiner—George Manuel
(74) Attorney, Agent, or Firm—Lawrence P. Trapani

(57) ABSTRACT

A method of determining eyeglass frame parameters from a digital image of the person's face and a digital image of an eyeglass frame. The method comprises the steps of: (a) providing a digital image of the person's face; (b) determining a physical scale of the face using a scaling factor; (c) locating center points $P_1$, $P_2$ of the left and right irises in the face image, and determining a pupil midpoint $P_c$; (d) providing a digital image of an eyeglass frame; (e) adjusting, if necessary, the size of the frame to the physical scale of the face; (f) combining the frame and face images such that the frame is superimposed on the face; (g) aligning the frame and face in accordance with the frame center point $f_c$ and the pupil midpoint $P_c$; and (h) determining the frame parameters.

36 Claims, 15 Drawing Sheets

INTERACTIVE EYEWEAR SELECTION SYSTEM

CROSS-REFERENCE TO RELATED APPLICATIONS

This is a continuation of application Ser. No. 09/629,763, filed Jul. 31, 2000 now U.S. Pat. No. 6,231,188 which is a continuation of application Ser. No. 09/158,480, filed Sep. 22, 1998 now U.S. Pat. No. 6,095,650.

BACKGROUND OF THE INVENTION

1. Technical Field

The present invention relates to the optometry and optician fields, and more particularly to digital image processing and displaying apparatus for use by optometrists, opticians, eyeglass vendors, and related parties.

2. Background Art

When a person requires a new pair of eyeglasses, he or she usually visits an optometrist for an eye examination. Normally, an optician is also on hand to assist the person in selecting and fitting the new eyeglasses. After the eye exam, the person must select a frame for his or her eyeglasses. As many of us know, this process involves a review of many different frames made physically available to the person by the optician.

This process can be tedious, because: (1) the person may have to wait before being helped by an optician; (2) the person must choose from a large number of frame styles and manufacturers, usually requiring the assistance of the optician; (3) the person must physically try-on each of the frames selected for consideration; and (4) the person must preview each tried-on frame in a mirror without his or her prescription lenses, which can be difficult for some and inconvenient for most.

Also, when viewing frames on the face, the person does not see the optical effects of the prescription lenses to be placed in the frames. Thus, the person must select a frame without assessing this important aesthetic factor.

The above-described process requires the optician to display a large physical inventory of frames. This requirement is expensive, and inevitably limits the number and variety of frames that an optician can make available to the customer.

Once a particular frame is selected, the optician must then obtain certain measurements needed to produce the eyeglasses (i.e., the position of the customer's eyes with respect to the frame). These measurements include the distance between the pupils, the ocular centers, the monocular pupillary distances, and the segment heights. Such measurements are critical for the proper manufacture of the eyeglasses for the selected frames. If such measurements are not properly taken, the resulting eyeglasses become useless to the customer, and time and money are wasted. Such measurements are usually taken manually with a ruler or with the aid of various measurement devices. All such methods require skill and great care to achieve acceptable accuracy. In practice, such accuracy is not always attained.

Different approaches have been proposed to overcome the various drawbacks mentioned above with respect to frame selection and eye/frame measurement. One particularly interesting approach is to simulate the frames (or eyewear) in a computer and digitally superimpose such eyewear on a digital image of the customer. Systems to carry out such an approach are proposed in the following patents: U.S. Pat. No. 5,280,570 to Jordan; U.S. Pat. No. 4,852,184 to Tamura et al.; U.S. Pat. No. 4,845,641 to Ninomiya et al.; and U.S. Pat. No. 4,730,260 to Mori et al. These computer-based systems have not gained widespread acceptance in the eyewear industry and by the general public.

One reason for this lack of acceptance is that such systems may not be presenting a realistic composite image of the customer wearing a selected frame. For instance, the systems proposed in U.S. Pat. No. 5,280,570 to Jordan, U.S. Pat. No. 4,852,184 to Tamura et al., U.S. Pat. No. 4,845,641 to Ninomiya et al., and U.S. Pat. No. 4,730,260 to Mori et al., do not display the temple portions of the frames on the face. The absence of these temple portions is immediately apparent to the customer, and adversely affects the credibility of the system as perceived by the customer. As a result, the customer is not likely to rely on such a system for selecting frames.

U.S. Pat. No. 4,539,585 to Spackova et al. proposes merging a frame having a temple portion with a face image, using separately displayed images of the frame and face and combining them with a half mirror. A digital processor embodiment is also proposed, however, it is not explained how the frame and face images are to be merged in the digital processor.

Further, as to the realism issue, the systems proposed in U.S. Pat. No. 5,280,570 to Jordan, U.S. Pat. No. 4,852,184 to Tamura et al., U.S. Pat. No. 4,845,641 to Ninomiya et al., and U.S. Pat. No. 4,539,585 to Spackova et al., do not address the problem of superimposing transparent and semi-transparent frames and frame parts (such as the nosepad) on a face image. Transparent and semi-transparent frames (or parts thereof) pickup background color when the frame image is created. This background color is very noticeable in the frame (or frame part) when viewing the composite image, and thus conveys a fake and not very convincing appearance. U.S. Pat. No. 4,730,260 to Mori et al. recognizes this problem, however, it fails to describe any real solution.

Another possible reason why the above-mentioned patented systems have not gained widespread acceptance is that such systems do not provide automatic measurement of the eye/frame parameters necessary to manufacture the lenses for the selected frame. U.S. Pat. No. 5,617,155 to Ducarouge et al. proposes a system to automatically obtain the eye/frame measurements by way of pupil and frame detection. However, in Ducarouge et al., the customer must wear a selected frame before his or her image is acquired by the system. Thus, the customer must choose his or her frame in the conventional manner before the system can be used, and the optician must carry a full complement of frames as is conventionally done. Similarly, in U.S. Pat. No. 5,592,248 to Norton et al., the customer must wear a selected frame before his or her image is acquired and measurements are made.

In U.S. Pat. No. 5,280,570 to Jordan it is mentioned that the shape of the customer's face is an important factor in selecting frames. However, in Jordan, the customer or optician must first determine the shape of the customer's face and then manually enter this parameter into the system. Such a process may be inconvenient and may yield an incorrect face shape determination. For example, it may be difficult for an inexperienced optician to distinguish between oblong and oval faces.

U.S. Pat. No. 5,576,778 to Fujie et al. proposes a system which acquires the face image of the customer and, through digital image detection, automatically determines the face shape and other facial features of the customer. The system then assists the customer in selecting frames that are best suited for his or her facial features. However, the Fujie et al. system does not simulate and superimpose eyeglass frames on the face image. Thus, the optician must carry a full complement of frames as is conventionally done.

OBJECTS AND SUMMARY OF THE INVENTION

It is therefore an object of the present invention to provide apparatus and methods that overcome the problems, drawbacks and limitations of the prior art.

It is another object of the present invention to provide apparatus and methods that aid the optician's customer in selecting a suitable frame for his or her eyeglasses.

It is a further object of the present invention to provide apparatus and methods that substantially eliminate the tedium normally associated with selecting eyeglass frames.

It is yet another object of the present invention to substantially reduce the physical inventory of frames that an optician must carry.

It is yet a further object of the present invention to provide apparatus and methods that simulate eyeglass frames and digitally superimpose such frames on a digital image of the customer, to create a composite digital image.

It is still another object of the present invention to provide a realistic composite digital image of the eyeglass frames being worn by the customer.

It is still a further object of the present invention to provide apparatus and methods that simulate the complete eyeglass frame, including the temple portions.

It is yet still another object of the present invention to simulate transparent and semi-transparent eyeglass frames and frame parts.

It is yet still a further object of the present invention to conveniently provide a wide variety of eyeglass frames to the customer for consideration. it is yet still a further object of the present invention to provide apparatus and methods that automatically detect the irises and pupil centers in a digital face image of a person.

It is yet still a further object of the present invention to provide apparatus and methods that automatically detect the shape of a person's face from a digital image of the person's face.

It is yet still a further object of the present invention to provide apparatus and methods that automatically measure the eye/frame parameters needed to produce eyeglasses.

It is yet still a further object of the present invention to provide apparatus and methods that simulate contact lenses on the eyes of a person, in a digital image of the person.

It is yet still a further object of the present invention to provide an interactive eyewear selection system that is easy to use and is otherwise "user friendly."

It is yet still a further object of the present invention to provide a structure for an eyeglass frame image and to provide methods for creating such a structure.

These and other objects are attained in accordance with the present invention wherein there is provided an interactive eyewear selection system, comprising: means for acquiring a digital image of a person's face, including the temple areas of the face; means for storing digital eyeglass frame images, said storage means containing a plurality of eyeglass frame images; means for selecting an eyeglass frame image from said storage means, said image containing frame temple portions; means for superimposing the selected frame image on the image of the person's face, in a composite image, such that the frame appears to be worn naturally on the person's face and the frame temple portions are shown at the temple areas of the face; and means for displaying the digital image of the person's face and for displaying the composite image.

In accordance with the present invention there is provided a method of combining an eyeglass frame image with a face image. The method comprises the steps of: (a) obtaining a digital image of a person's face; (b) selecting a digital eyeglass frame image, the frame image having left and right temple segments; and (c) digitally combining the frame image with the face image to produce a composite image that portrays an eyeglass frame superimposed on a face, the eyeglass frame portrayed in the composite image having left and right temple segments that correspond the left and right temple segments of the frame image.

In accordance with another aspect of the present invention, there is provided a method of detecting the irises and pupil centers of a person, in a digital image that includes the face of the person. The method comprises the steps of: (a) providing a gray level image that encompasses the eyes of the person, one eye being in a left area of the image and the other eye being in a right area of the image; (b) converting the gray level image to a binary image based on a dynamic threshold T; (c) searching the left area of the binary image for black objects and calculating the size and centroid coordinates of each black object found; (d) searching the right area of the binary image for black objects and calculating the size and centroid coordinates of each black object found; and (e) selecting a black object as a candidate for the iris in each of the left and right areas of the binary image, in accordance with the following selection criteria—(i) the black object selected in the left area is approximately the same size as the black object selected in the right area, and (ii) the black object selected in the left area is approximately at the same level as the black object selected in the right area.

In accordance with another aspect of the present invention, there is provided a method of detecting the shape of a person's face in a digital image that includes the face of the person. The method comprises the steps of: (a) determining the contour of the person's face in the digital image; (b) converting the person's face contour into the frequency domain by a Fourier transformation of a space domain function representing the contour; (c) providing a plurality of standard face contours represented in the frequency domain, each of the standard face contours having a name associated therewith; (d) comparing the frequency domain representation of the person's face contour with each of the plurality of standard face contours, to determine the best match; and (e) assigning the name of the standard contour that was determined to be the best match in step (d), to the person's face contour.

In accordance with another aspect of the present invention, there is provided a method of determining the frame parameters—monocular PDs, ocular centers, and seg-heights, automatically from a digital image of a person's face and from a digital image of a selected eyeglass frame.

In accordance with another aspect of the present invention, there is provided a method of pre-processing digital images of eyeglass frames for storage in a frames database, and a particular data structure for the frame image. The frame processing method includes pre-processing for opaque, semi-transparent and transparent frames, and for the nosepad portion of the frame. Size scaling factors for the rims and bridge of the frames are calculated so that only one size need be stored in the frames database. Different size frames of a particular style are created digitally, based on the calculated scaling factors.

In accordance with a further aspect of the present invention, there is provided a method of selecting eyeglass frames in the interactive eyewear system by barcode scanning or manually entering an SKU It into the system. The frames database is indexed by SKU Its.

In accordance with yet another aspect of the present invention, there is provided a method of digitally superimposing color contact lenses on a person's eyes, in a digital color image of the person's face.

BRIEF DESCRIPTION OF THE DRAWING

Further objects of the present invention will become apparent from the following description of the preferred embodiments with reference to the accompanying drawing, in which.

DESCRIPTION OF THE PREFERRED EMBODIMENT

Figure 1:
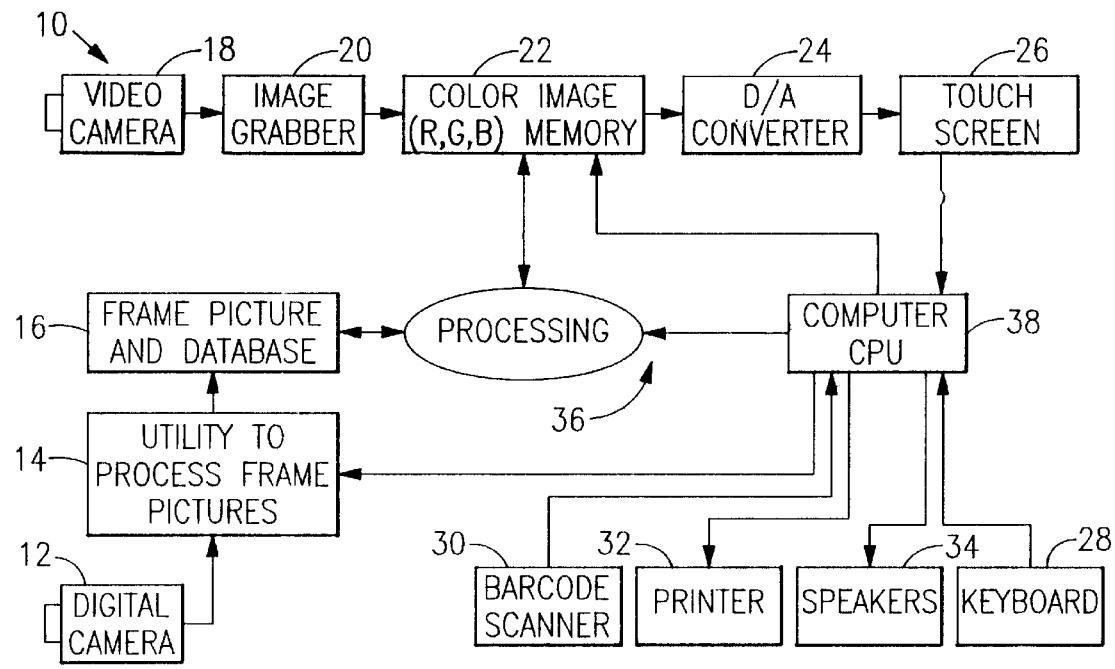
FIG. 1 is a system block diagram of the interactive eyewear selection system of the present invention.

Referring now to FIG. 1, there is shown a block diagram of the eyewear selection system 10 of the present invention. System 10 is configured in two subsystems. The first subsystem is designed to take high resolution, full color digital photographs of eyeglass frames, and to create an eyeglass frame database to be used in the second subsystem. The second subsystem interfaces with the user to acquire a high resolution, full color digital photograph of the user's face, and to digitally superimpose a frame image from the database on the image of the user's face.

As shown in FIG. 1, the first subsystem (or "frame image processing system") includes a still digital camera 12, a utility computer program 14 for pre-processing the digital photographs of the eyeglass frames, and an eyeglass frame database 16. Digital camera 12 should have a picture resolution of about 600×240 pixels. A suitable still digital camera is the DC40, commercially available from Kodak, Rochester, N.Y. The eyeglass frame photographs are taken in a 24-bit color format. Program 14 pre-processes the frame photograph, derives certain frame data from the pre-processing, and records the photograph with the frame data in database 16. Program 14 will be described in greater detail hereinbelow. In FIG. 1, database 16 is conceptual—the database is actually stored in the system's hard drive memory.

The second subsystem (or "interactive eyewear selection system") employs a high resolution CCD color video camera 18 for acquiring the image of a person's face. Camera 18 should have a photo size/resolution of 440×440 pixels. A suitable video camera for this application is the VCD-510C color video camera, by ProVideo.

An image (or frame) grabber card 20 receives the video output of camera 18 and converts it to a standard 24-bit color digital image. A suitable image grabber is the Marvel-Millennium board, by Matrox. The digital image generated by grabber 20 is stored in a color image (r,g,b) memory 22, which is part of the system's hard drive. At the same time, the digital image is converted back to analog form by a D/A converter 24 for display on a touch screen video monitor 26.

Monitor 26 provides direct interactive capability to the user, allowing the user to navigate through the system and make selections by touching the screen. In this preferred embodiment, the touch screen is the primary interface mechanism between the user and the system. This feature contributes to the "user friendly" aspect of the system. An alternative embodiment may employ speech recognition technology to accomplish interactive functions between the user and the system.

A keyboard 28 and barcode scanner 30 are also provide as input devices to the system. Keyboard 28 may be used to input commands for controlling system 10 and its frame image processing and eyewear selection functions. Barcode scanner 30 is used with a standard program to read, into the system, barcoded SKU numbers from actual eyeglass frames. Once entered into the system, the SKU number is used to retrieve the corresponding frame image from database 16. This process will be further described below.

A printer is included to print out various forms of data and to provide the system operators and users with hardcopy of frame images, face images, and composite (frame on face) images. A pair of speakers 34 are used to generate audio messages and instructions to the user. This feature contributes to the "user friendly" aspect of the system.

Both subsystems of system 10 are operated under the control of computer processing unit 36. In the preferred embodiment, computer processing unit 36 includes a general purpose personal computer 38, employing a Pentium microprocessor. Computer 38 contains a number of processing and utility programs for carrying out the various jobs and functions of both subsystems of system 10. The processing methods embodied in these programs will be described in detail hereinbelow.

System Calibration

Before system 10 can accurately superimpose a frame image onto a face image, and calculate relevant frame parameter data, system 10 must be initially calibrated. The key here is to obtain the actual physical scale for the face image. The procedure is as follows: (1) the distance D between video camera 18 and the location where the person will sit when the camera acquires his or her face image, must be fixed; (2) an eyeglass frame with known size (i.e., "EYE") is worn by an operator who sits at the pre-set image acquiring location, and the operator's facial image is acquired by camera 18—the precise distance D must be maintained; (3) two adjustable vertical bars are computer generated on touch screen 26, and are adjusted by the operator so that one is at the left temple and the other is at the right temple of the frame (i.e., the front of the frame is closely situated between the two vertical bars), and then processing unit 36 calculates the distance d between those two bars internally, and the frame size parameters, EYE and DBL, are entered from keyboard 28 by the operator; and (4) the physical scale for system 10 is calculated using the equation, s=d/(2·EYE+DBL), and all subsequent physical size calculations performed in system 10 will be based on scale s.

Superimposition of Frame on Face

Superimposing an eyeglass frame image on a user's face image, to create a composite image, is one of the primary aspects of the interactive eyewear selection system. The objective is to naturally blend the frame image with the user's image, while maintaining the original frame image quality.

To begin with, a user's face image is acquired from video camera 18. Still digital camera 12 has taken high quality digital photographs of a number of eyeglass frames. As a result of the high resolution capability of cameras 12 and 18, the actual design patterns on the eyeglass frames will be clearly visible in the composite image. This is important to the user/customer who is attempting to select a frame for purchase.

The frame images should be processed with great care. The background of the image should be removed smoothly and completely, especially the intersection between the background and the actual frame depiction. Otherwise, the frame on the face, in the composite image, will look fake. The necessary frame image pre-processing is performed under the control of utility program 14, which will be described in detail below. Here we assume that the frame image has been processed properly and the user's image is of high quality.

Figure 2:
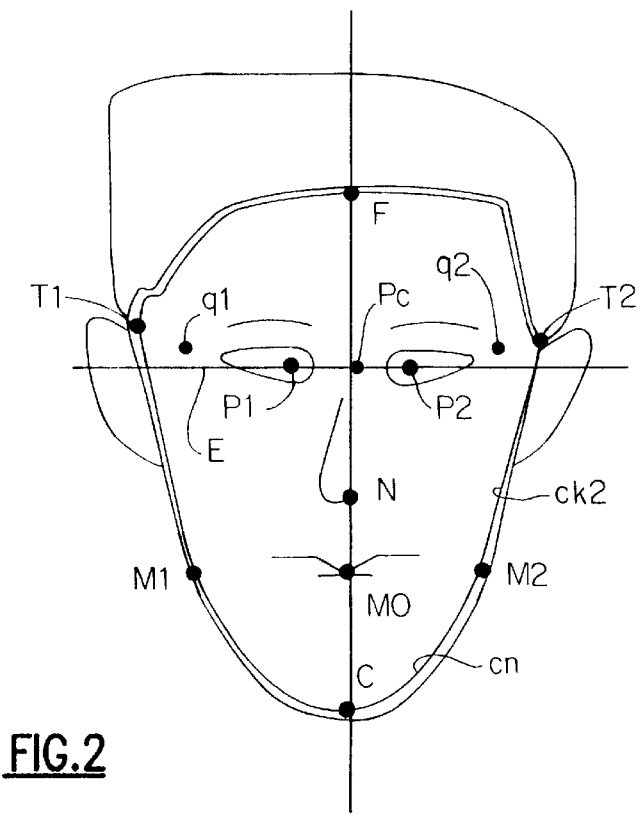
FIG. 2 is a drawing illustrating a digital face image containing a number of points determined by the system in FIG. 1.
Figure 3:
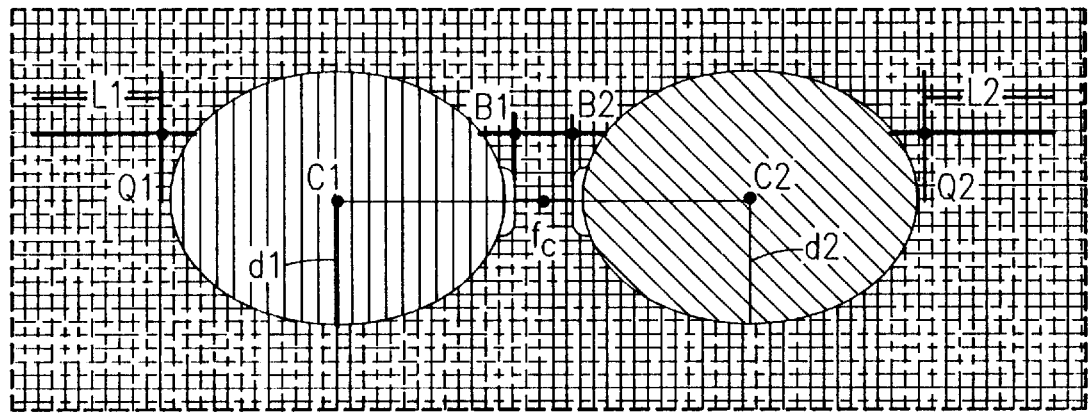
FIG. 3 is a drawing illustrating a digital frame image after pre-processing by the system in FIG. 1.

Referring to FIG. 2, some essential face image parameters, such as pupil centers (P1, P2), interpupil distance (Pc), and face edges (T1, T2), have been detected (or calculated) and recorded in accordance with "pupil center" and "face edge detection" algorithms, to be described in detail below. As to the frame image, some key frame parameters and information have been calculated or determined, as shown in FIG. 3. These frame parameters and information are recorded in database 16.

To superimpose the frame image (represented in FIG. 3) on the face image (represented in FIG. 2), four critical issues must be addressed. First, to make the frame look natural on the face, the frame data must be blended into the face properly, especially at the rim edge. Otherwise, there is an abrupt jump from the frame to the face. This jump destroys any realistic impression in the composite image. Therefore, a blending coefficient α(x,y) is defined. The composite image C is generated according to the following equation:

$$C(x,y)=\alpha(x,y)\cdot\text{face}(x,y)+[1-\alpha(x,y)]\cdot\text{frame}(x,y) \quad (1)$$

where face(x,y) is the face image and frame(x,y) is the frame image, and $$\text{where } \alpha(x, y) = \begin{cases} 0; & (x, y) \in \text{frame} \\ 0.6; & (x, y) \in \text{frame edge} \end{cases}$$

As indicated by the above expression, the blending coefficient α(x,y) is assigned to the frame points, to the frame edge points, and to the flood-filled, red, yellow and green, background points of the frame image (See FIG. 3 and discussion below under the "Frame Image Processing" section). The value of the blending coefficient is set to 0 for the frame points, to 1 for the background points (r,y,g), and to 0.6 for the frame edge points. The value of α(x,y), for the frame edge points, may be set in a range of about 0.5 to about 0.7.

Before the frame and face images are blended, a 5×5 pixel neighborhood is checked for each location (x,y) in the frame image. If a frame point is detected, background points b are counted in the neighborhood. If b>10, the location (x,y) is considered the frame edge, and α(x,y) is set to 0.6. If the b>10 condition is not satisfied, α(x,y) is set to zero. α(x,y) is set to 1 for the background points.

The appearance of the frame temples are very important to make the composite image look natural. One could imagine what a composite image would look like if a frame, without temples, is put on a bald head, for example. It is totally unacceptable. Therefore, by putting temple information in the composite image, a significant advancement is achieved by the present invention.

As a result of face edge detection and pupil center detection algorithms (to be described in detail below), we know the positions of face edge points T1 and T2 (See FIG. 2). The frame temples should appear from those two points. We also know the position of interpupil distance (or pupil midpoint) $P_c$. Also, from the pre-processed frame image (FIG. 3), we know temple points Q1 and Q2, frame center point $f_c$, and temple segments L1 and L2.

Based on earlier calibration, the frame image is correctly scaled down and superimposed on the face image. The frame image is superimposed on the face image by aligning frame center point $f_c$ (in the frame image) over pupil midpoint $P_c$ (in the face image). The frame image may be adjusted relative to the face image by an automatic adjustment factor E and/or a manual adjustment factor $\delta$. These adjustment factors will be described further below with reference to the "Frame Parameters" section.

Figure 4:
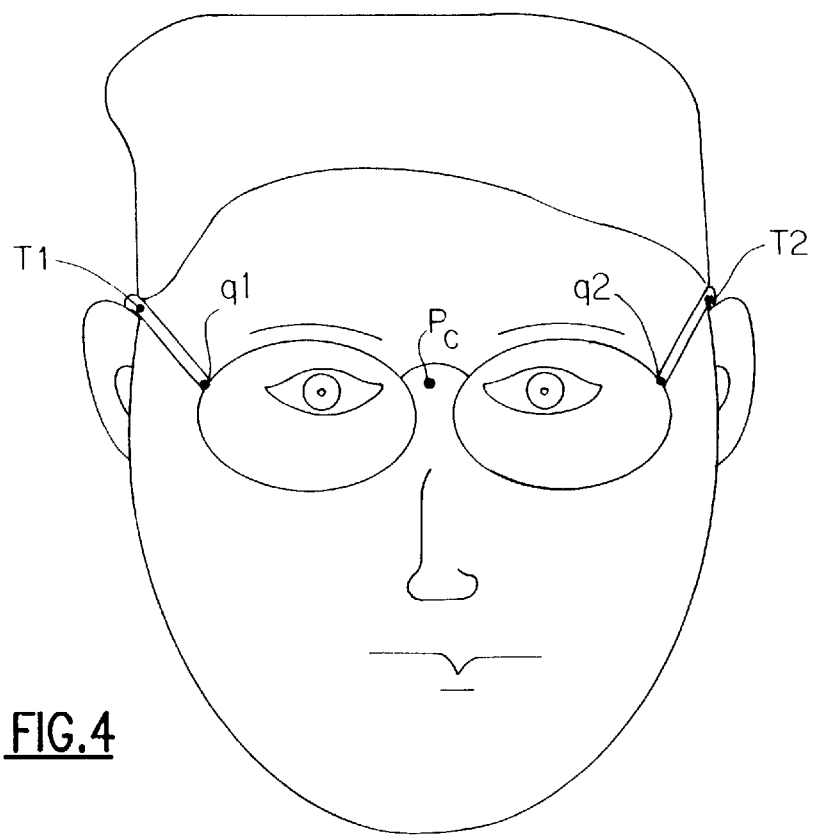
FIG. 4 is a drawing of a composite digital image, showing the superimposition of a frame image onto a face image.

The left and right temple points Q1 and Q2 of the frame image are mapped onto the face image, to define left and right temple points q1 and q2, respectively, on the face image. Then left and right temple lengths q1–T1 and T2–q2 are calculated for the face image. When the frame image is scaled to the face image, left and right temple segments L1 and L2 are scaled to the temple lengths q1–T1 and T2–q2, respectively. The frame image is combined with the face image to produce a composite image, in accordance with equation (1) above. The scaled temple segments of the frame image appear in the composite image between points q1 and T1 and points T2 and q2, respectively, as shown in FIG. 4.

Figure 5:
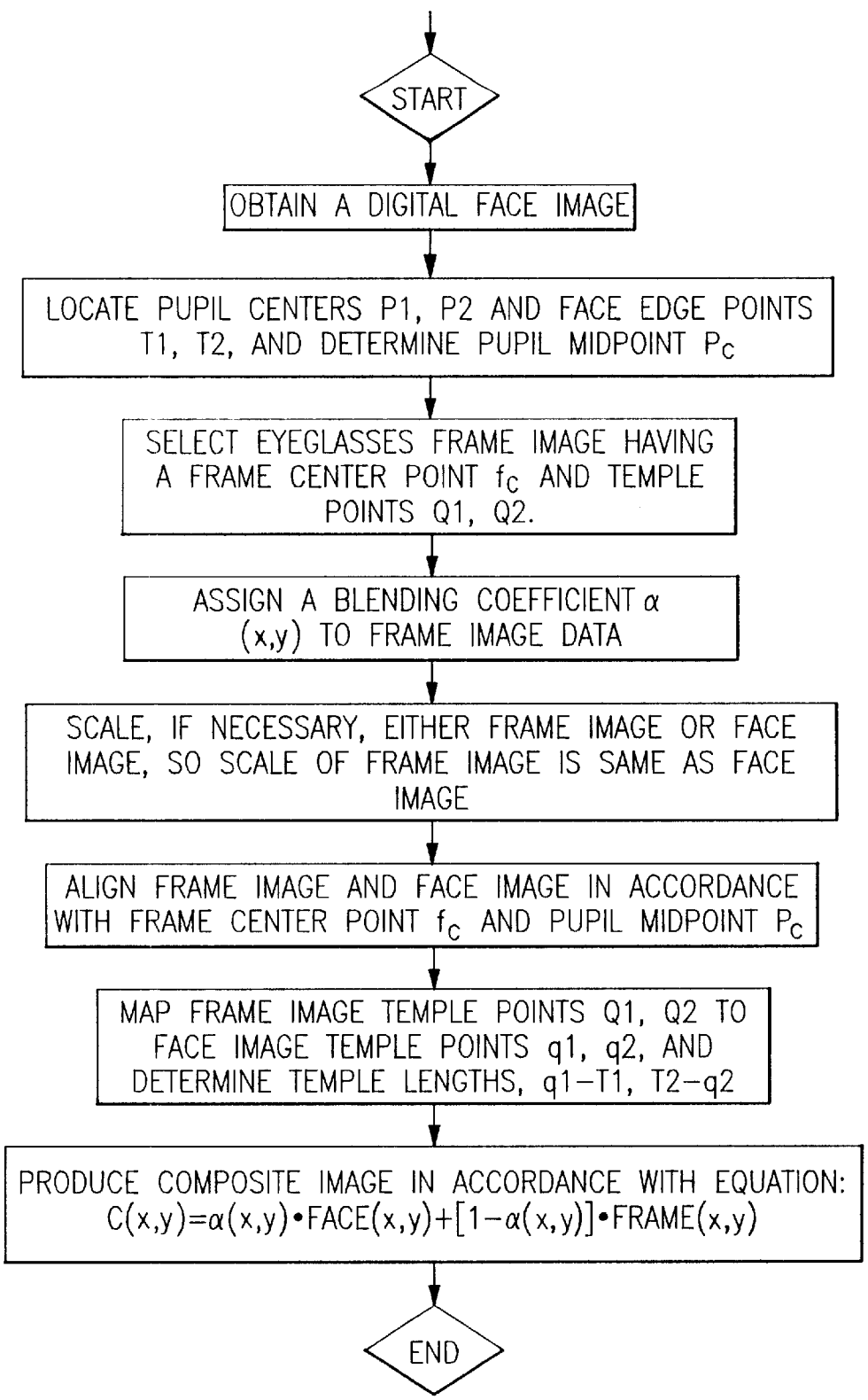
FIG. 5 is a flow diagram outlining the process by which the system in FIG. 1 superimposes a frame image onto a face image.

FIG. 5 is a flow diagram illustrating the general process of superimposing a frame image on a face image, in accordance with the present invention.

To show the temple segments naturally in the composite image, the temple segments are faded out gradually from q1, q2 to T1, T2, respectively. This is done by assigning a fading coefficient $\alpha_1(x,y)$ to the scaled temple segments. Thus, the composite image at the temple segments is determined by the following equation:

$$\text{composite image} = \alpha_1(x,y) \cdot \text{face} + [1-\alpha_1(x,y)] \cdot \text{frame} \quad (2)$$

where $\alpha_1(x,y) = 0.6[x-T_1(x)]/(q_1(x)-T_1(x))$ (for left temple)

$\alpha_1(x,y) = 0.6 \cdot [x-T_2(x)]/(q_2(x)-T_2(x))$ (for right temple)

The 0.6 factor in the above expressions was determined empirically. This factor may be in the range of about 0.5 to about 0.7.

If the user adjusts (directly on touch screen 26) the frame position on the face, in the composite image, the temple lengths and positions are re-calculated correspondingly.

Representing the nosepad portion of the frame, and transparent frames, in the composite image require special attention. The nosepad area seems to be a trivial problem. However, the nosepad is usually made from transparent material. When a frame picture is taken, the nosepad area will pick up the background color, even if the background is white. The nosepad area will retain the background color in the composite image, instead of skin tone. It makes the composite image look fake. To overcome this problem, during frame pre-processing (see details below under the File Nosepad section), we reserved a particular color N=(235,235,235) for the transparent area of the nosepad. When we put the frame image on face image, the transparent area of the nosepad is converted to the following color $$\text{nosepad} = 0.8 \cdot \text{face} + 0.2 \cdot N \quad (3)$$

Here, the transparent area of nosepad is only transferred to color N=(235,235,235). The rest of the nosepad color, such as shadow and any metal part, are still retained. Otherwise, the nosepad would look fake as well. The color N was empirically determined. A detailed discussion of pre-processing for the nosepad is provided below.

Transparent frames also need special attention. Otherwise the background color will appear in the composite image. Most transparent frames have a color pattern where the frame is partially opaque or semi-transparent in certain portions. Therefore, nosepad approach is not suitable. In this case, a blending coefficient c(x,y) is created to represent the percentage of transparency at each pixel in the frame image. This is part of the pre-processing of the transparent frame image, which will be described in greater detail below. The composite image for a transparent frame is determined by the following equation:

$$C(x,y) = [c(x,y)/255] \cdot \text{face}(x,y) + [1-c(x,y)/255] \cdot \text{frame}(x,y) \quad (4)$$

Frame Parameters

In order to manufacture eyewear, certain frame parameters are required. These parameters include the left and right monocular pupil PD, the left and right ocular centers, and left and right seg-heights. Currently, in optical industry, these parameters are measured manually or with the help of some devices. With those burdens, it is impossible to obtain high accuracy and automation for eyewear manufacturing. The present invention provides a unique method for automatically determining the above-mentioned parameters. Such automatically derived data can be transferred to a laboratory through modem, LAN, WAN or Internet. The eyewear can be manufactured directly by using such data.

As mentioned previously, pre-processed frame images (See FIG. 3) have been stored in database 16. Several parameters of the frames, such as $d_1$, $d_2$ and $f_c$, have been calculated in utility program 14, and stored in database 16. Frame image pre-processing is described in greater detail below under the Frame Image Processing section.

Assume that eyewear selection system 10 is calibrated during system setup. After the user's face image is acquired by the system, the physical scale of the photo is determined. As described in the Pupil Detection section below, tile pupil centers (P1, P2), initerpupil distance $P_c$, and iris radii ($R_j$, $R_r$) are automatically detected or calculated. At the same time, the frame image is properly scaled to the face image. With good calibration, a one-millimeter tolerance can be achieved.

Figure 6:
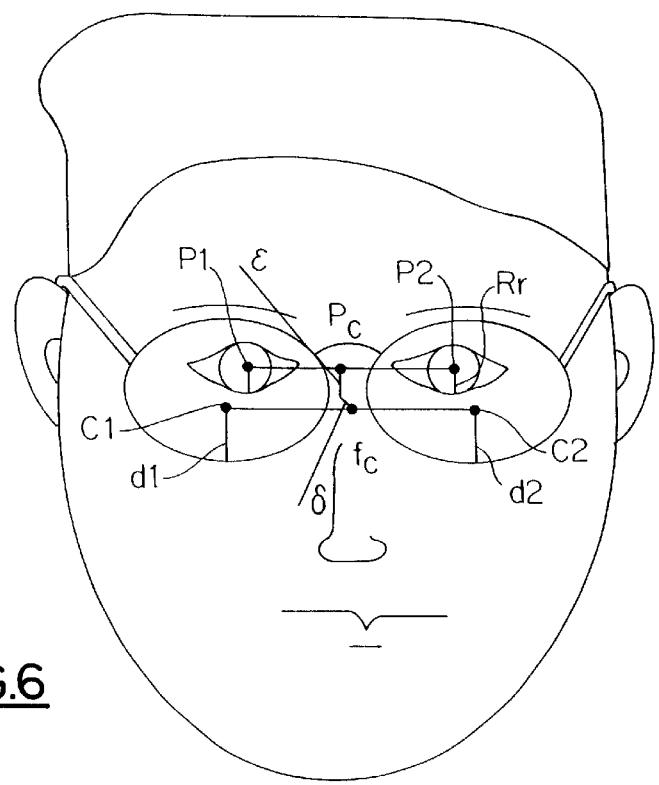
FIG. 6 is a drawing of a composite digital image containing a number of points and other data for automatic measurement of frame parameters by the system shown in FIG. 1.

Once the user selects a desired frame, the system superimposes the frame on the user's face image. The frame superimposed on the face image has been re-sized according to the physical scale. Then the user is able to adjust the position of the frame, if necessary, by touching screen 26. For example, refer to FIGS. 6 and 7. When the frame is superimposed on the face, the system aligns the frame center $f_c$ of the frame image with the pupil midpoint $P_c$ of the face image. To best position the frame on the face, sometimes, a small shift or adjustment $\epsilon$ is introduced during superimposition. This $\epsilon$ is a pre-defined constant. In most cases, the frame will be put on the face in the correct position. However, if the user wishes to manually adjust the frame position on the face, the system can trace such adjustments with the factor $\delta$. Without manual adjustment, $\delta=0$. From the above data, the frame parameters are easily calculated in accordance with the following equations:

Monocular PD:

Left=$abs(P_c-P1+\epsilon(x)+\delta(x))$

Right=$abs(P2-P_c+\epsilon(x)+\delta(x))$

Ocular Center:

$$O_l = abs(\epsilon(y) + \delta(y) + d_1)$$

$$O_r = abs(\epsilon(y) + \delta(y) + d_2)$$

Seg-height:

$$S_l = abs(\epsilon(y) + \delta(y) + d_1 - R_l)$$

$$S_r = abs(\epsilon(y) + \delta(y) + d_2 - R_r)$$

Where x and y stand for horizontal and vertical coordinates, and where it is assumed that the centroids C1, C2 of the frame rims (See FIG. 6) would be aligned with the pupil centers P1, P2 if $\epsilon(x,y)$ and $\delta(x,y)$ are zero.

Figure 7:
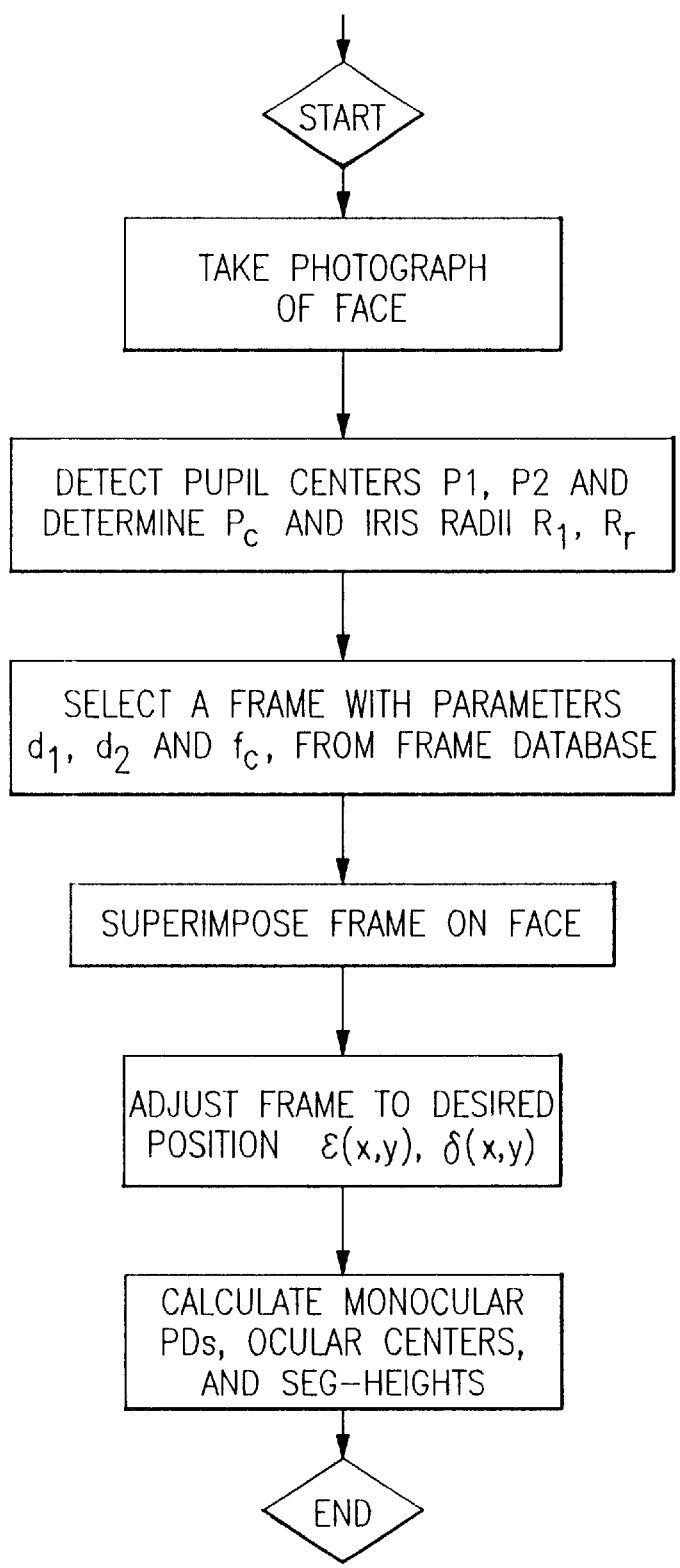
FIG. 7 is a flow diagram outlining the process by which the system in FIG. 1 automatically determines the frame parameters needed to manufacture eyewear.

FIG. 7 is a flow diagram illustrating the general process of obtaining the necessary frame parameters, in accordance with the present invention.

Pupil Detection

Pupil detection is a fundamental step for all advanced features included in system 10, such as automatic frame parameter determination. In this description, it is assumed that the pupil center is the same as iris center. The pupil detection method described here is based on image processing technology. The initial input is a digital photograph of the user's face. When a photograph is taken by system 10, the front of the user's face must appear in the center portion of the photograph. In addition, the eyes must be aligned with a horizontal reference, "eye level" line E, computer generated on screen 26 (See FIG. 2).

Using video camera 18 and frame grabber 20, a true-color digital image (24 bit) is acquired. The following pupil detection processing is performed in processing unit 36 under the control of a pupil detection computer program. Initially, the 24 bit color digital image of the user's face is converted to a gray level image using the NTSC standard. Next, a centerline must be established in the image as a reference. In normal operation, the user is asked to position his/her face in the center of the screen. However, this is not always done in practice. Therefore, the nosetip N (See FIG. 2) is detected in the digital image to establish the centerline. The centerline is drawn vertically through the y coordinate of the nosetip point N. This technique will ensure the establishment of a more accurate centerline.

In order to find the nosetip, a 100×80 pixel sub-image is selected for processing. The sub-image is extracted from the original image, 80 pixels below eye level and 50 pixels to left and right of the image center. Then, the average brightness f(x,y) in the sub-image is calculated in a 5×5 pixel neighborhood. It is assumed that the nosetip should be the brightest point in the sub-image. Therefore, the nosetip position $(x_o, y_o)$ is determined by the following criteria:

$$(x,y) \text{ when } Max[f(x,y) > 180]$$

If this search fails, the image center is used as a default centerline.

Next, an area s(x,y) is selected with a width 60 pixels around the eye level. Then, the gray level image in this 60 pixel strap is converted to a binary image. Before doing this, linear mapping is introduced to increase the image contrast. The mapping equation S is:

$$S(x,y) = [s(x,y) - Min(s)] \cdot 255/[Max(s) - Min(s)]$$

To get the best binary image to represent the irises, a dynamic threshold T is determined to accomplish this task. To determine T, the average brightness of the sub-image A is investigated. At the same time, the histogram of the sub-image H is calculated. The following criteria have been empirically derived for setting an optimal dynamic threshold:

$$T = t_0 \text{ when } \frac{\sum_{i=0}^{t_0} H(i)}{\sum_{i=0}^{255} H(i)} \leq p;$$

$$\text{where } p = \begin{cases} 0.125; & A > 114 \\ 0.167; & \text{otherwise} \end{cases}$$

The binary image is obtained by $$B(x,y) = \begin{cases} 0; & S(x,y) < T \\ 255; & \text{otherwise} \end{cases}$$

After converting to the binary image, black objects are exhaustively searched in the binary image, in the left and right sides of the centerline, separately. The search is processed from top to bottom. The 4-pixel connection method is applied to find all black pixels for each individual object. This is standard image processing technique. The object size A and centroid coordinates are calculated for each object found.

To save processing time, all objects with a size A smaller than 100 are thrown away. Then the best candidate for the iris is selected according to the following criteria:

1. The black object selected in the left area is approximately the same size as the black object selected in the right area, $abs(A_L - A_R) < 50$.
2. The black object selected in the left area is approximately at the same level as the black object selected in the right area, $abs(Y_L - Y_R) < 20$.
3. The distance between the black object selected in the left area is not too far or too close to the black object selected in the right area, $100 < abs(X_L - X_R) < 340$.
4. The black object selected in the left area and the black object selected in the right area are the most symmetric about the centerline, $Min[abs(x_L - X_R - 2*centerline)]$.

After finding the iris candidates, the centroid coordinates of those objects indicate the pupil centers and their radii.

However, the pupil center position may not be accurate enough. Thus, a procedure is employed to fine tune the pupil center positions. The basic assumption here is that iris is a circle-like object and we know the approximate positions of the pupils. Therefore, the most circle-like edge is searched in a 20×20 pixel neighborhood of each pupil. The edge point, $E(x_0, y_0)$, is regarded acceptable as a possible iris edge, if the average intensity inside a test circle, with a 2 pixel radius, is less than that outside the test circle, otherwise the point is ignored. When acceptable, the edge point $E(x_0, y_0)$ is set to black, according to the following equation:

$$E(x_0, y_0) = \begin{cases} 0; & 1.5 \cdot \sum_{(x_{in}-1, y_{in}-1)}^{(x_{in}+1, y_{in}+1)} f(x,y) \leq \sum_{(x_{out}-1, y_{out}-1)}^{(x_{out}+1, y_{out}+1)} f(x,y) \\ 255; & \text{otherwise} \end{cases}$$

Where f(x,y) is the gray level image intensity, and $(x_{in}, y_{in})$ and $(x_{out}, y_{out})$ are points just inside and outside the test circle, defined by:

$(x_{in}, y_{in}) = (x_0 - 2\cos(\eta), y_0 - 2\sin(\eta))$ $(x_{out}, y_{out}) = (x_0 + 2\cos(\eta), y_0 + 2\sin(\eta))$ where $\eta$ is the direction from the circle's center to the point $(x_0, y_0)$ measured with respect to the x axis. After we got those circle-lice edge points, the circle patterns with different radii were used to find the best match. A variable C is used to record the match points. When we move the circle pattern around the neighborhood, we can find the Max (C) and record the circle center at $(x_0, y_0)$ and radius R. R will be the radius of the iris, and $(x_0, y_0)$ will be pupil centers P1 and P2. The pupil midpoint or interpupil distance PC is also calculated from P1 and P2.

Figure 8:
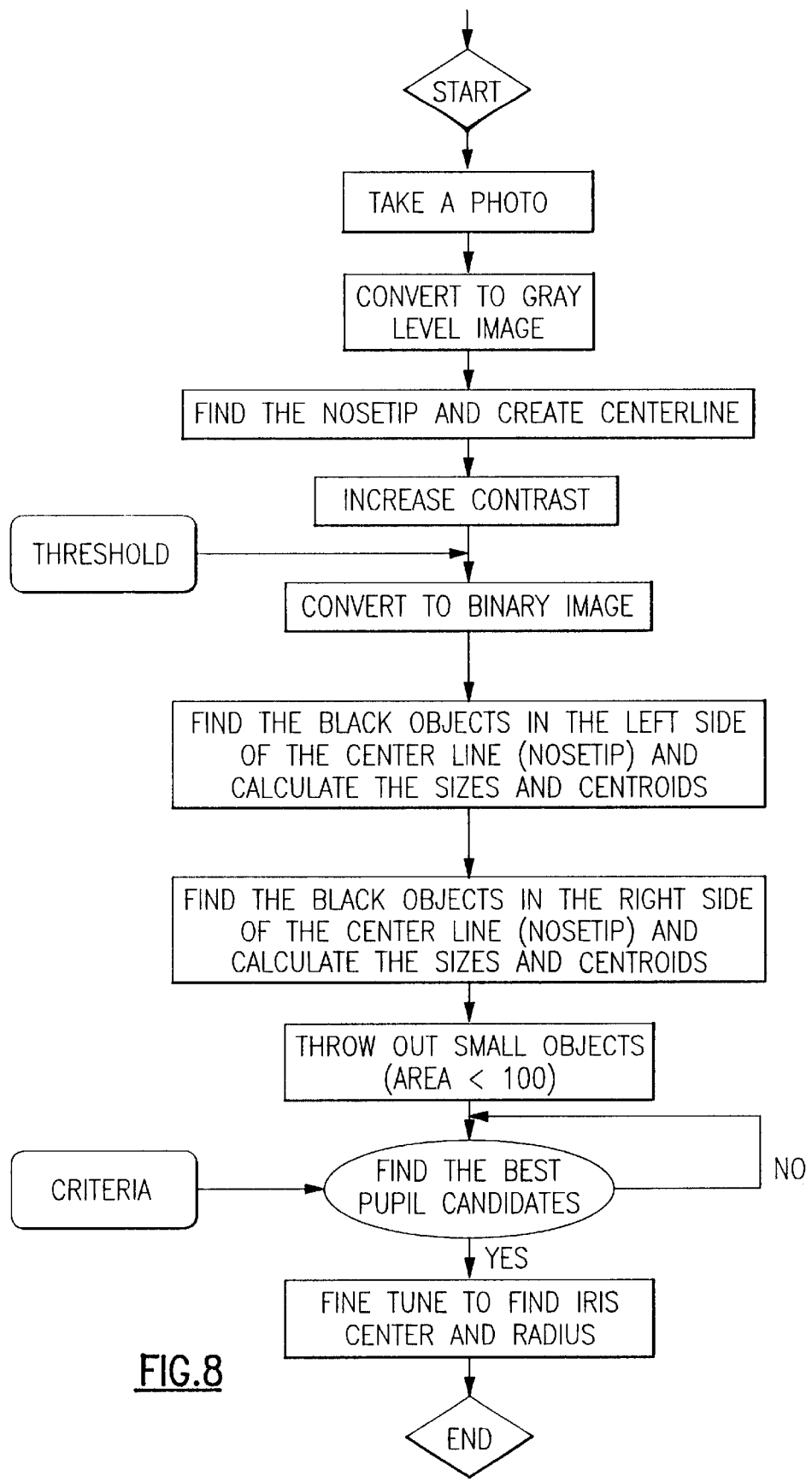
FIG. 8 is a flow diagram outlining the process by which the system in FIG. 1 automatically detects the pupil centers and, iris radii of a person's eyes, from a digital image of the person's face.

FIG. 8 is a flow diagram summarizing the general process of pupil detection in accordance with the present invention.

Face Edge Detection

Face edge detection is a necessary step to mount the temple portions of the frame at the correct positions on the face, in the composite image. It also provides preliminary parameters for a facial shape detection method to be described hereinbelow. For face edge detection, a 100 pixel wide sub-image is selected around the eye level. This sub-image is converted to a binary image using the same procedure described above with respect to pupil detection. In the binary image, there are usually some isolated small black objects which may cause problems with face edge detection. To overcome this difficulty, the standard morphologic method erosion (See reference book: Fundamentals of Digital Image Processing, by Anil K. Jain) is employed to remove those isolated small objects. The erosion window size is 3×3.

After erosion, the binary image is clear enough to allow edge detection to begin. Here, it is assumed that the face edge at the temple area will comprise vertical edges. Therefore, in a first step, all possible vertical edges are detected. Here, the vertical edge detection operator $$\begin{bmatrix} 1, & 0 \\ 1, & 0 \\ 1, & 0 \end{bmatrix}$$

is used to convolve the binary image to obtain another binary image, $f_b$, to enhance the vertical edges.

Usually, some vertical edges in $f_b$ may break into small pieces. In order to find long enough vertical lines, a morphologic dilation operation is applied to the image $f_b$. The dilation window is 3×7. After this operation, most of the vertical lines are reformed.

Figure 9:
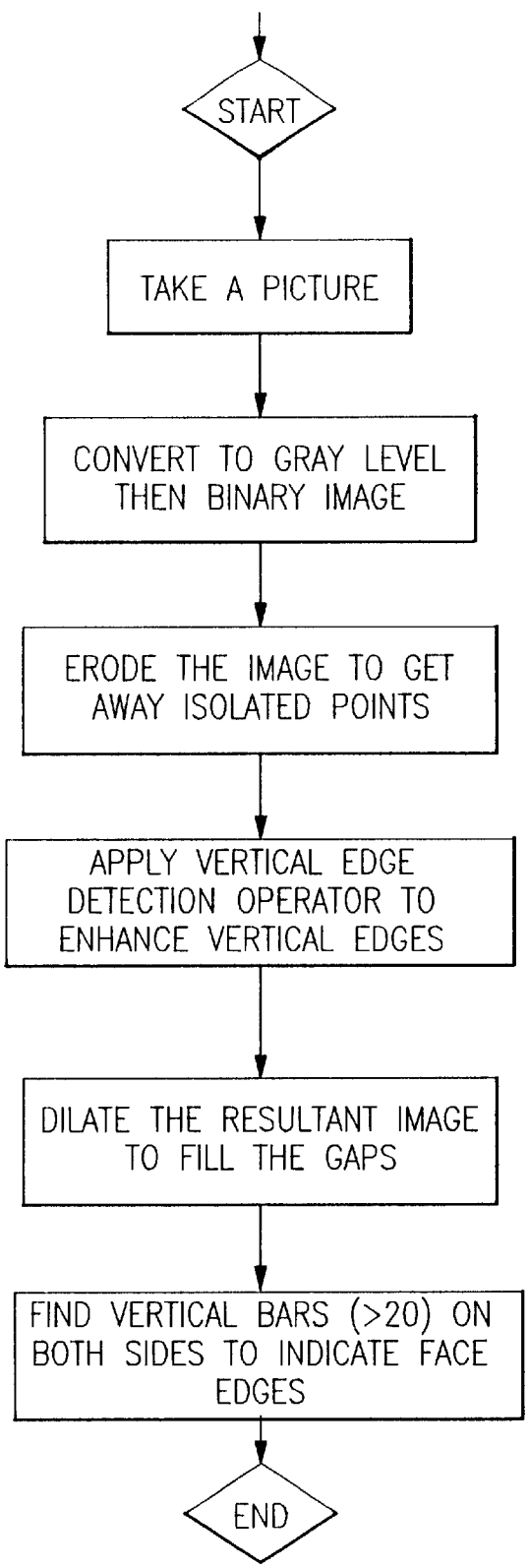
FIG. 9 is a flow diagram outlining the process by which the system in FIG. 1 automatically detects certain points at the edge of a person's face, from a digital image of the person's face.

Now the search for face edge points T1 and T2 can start. For simplification, the search for the left face edge point T1 will be described. The same procedure is applied to right side edge point. Starting from the left pupil center P1 (See FIG. 2), a search is made to the left, horizontally, to find a face edge point $T_1$ in image $f_b$. Then from point $T_1$, the search continues upward and downward in a vertical strap having a 6 pixel width, to find any connected edge points which define a vertical edge. The accumulation of those connected edge points is counted in C. If C>20, the search is terminated and the point $T_1$ is used as the left face edge point T1 (FIG. 2). Otherwise, the search will continue towards the left side of image $f_b$. The procedure is repeated until a long vertical line is found, i.e., C>20. The face edge detection process of the present invention is outlined in the flow diagram of FIG. 9.

Facial Shape Detection

The shape of a person's face is an important factor, from a cosmetic standpoint, when selecting eyewear. However, in many cases, it is difficult for the user to identify his/her facial shape, and it is inconvenient as well. System 10 accomplishes automatic detection of the user's facial shape, in accordance with the present invention. Such a feature assists greatly in making the correct shape determination and provides a significant convenience to the user. This feature contributes to the "user friendly" aspect of system 10.

In the facial shape detection process of the present invention, a facial contour of the user's face is first constructed from the user's face image. Secondly, a facial shape determination is made based on the facial contour constructed. The contour is actually classified under one of five industry standard facial shapes. The classification step is a challenge despite having the standard facial shapes stored in memory, as a reference. It is difficult to provide a standard for judging the best match.

The process begins by obtaining a full color face image of the user. A digital photograph of the user's face is taken by camera 18 and directed through image memory 22 to processing unit 36, for image processing. Alternatively, a previously acquired and stored photograph may be retrieved from image memory 22. As described with respect to pupil center and face edge detection, the user's face image is converted to a NTSC standard gray level image, and the pupil centers (P1, P2) and face edge points (T1, T2) are obtained (See FIG. 10).

Figure 10:
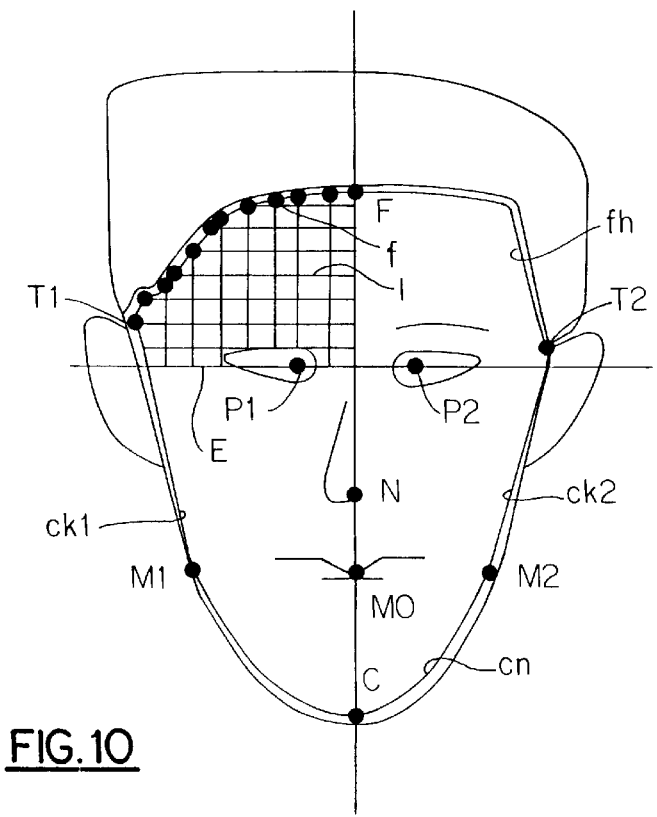
FIG. 10 is a drawing of a digital face image illustrating how the system in FIG. 1 automatically detects the contour of a person's face from the digital face image.

Next, the contour of the user's face is determined. To do so, some key points on the face are identified. The following steps are applied to find these points:

1. Find the nosetip N (FIG. 10). The procedure for detecting the nosetip has been described in the pupil detection section, and will not be repeated here.
2. Find the mouth position MO (FIG. 10). To do so, a function f(y) is created using the average brightness (3 pixels wide) along the centerline/nosetip from top to bottom. Then the second order derivative f"(y) of f(y) is calculated to determine the transition point from light to dark (this point is assumed to be mouth position M0). The mouth position will be:

$M_0 = \text{Max}(f''(y));$ where y>N (below the nosetip)

3. Find the bottom of the chin C (FIG. 10). Point C can be determined by the expression:

$C = \text{Max}(f''(y));$ where y>$M_0$ (below Mouth)

4. Find the top points of chin (M1, M2) (FIG. 10). To do this, a horizontal strap around mouth MO, 20 pixels wide, is selected. The linear mapping procedure described in pupil detection section is performed on the image to increase the contrast. The gray level image is converted to a binary image using the dynamic threshold equation, introduced in the pupil detection section. In this case, the threshold setting p is set to only one value, p=0.25. Searching proceeds to left and right from mouth point MO, until the first black point on each side is found. These two points are considered the top chin points M1 arid M2 (FIG. 10).
5. Fitting the boundary of the chin (FIG. 10). After obtaining the three key points (C, M1, M2), those points are fitted with a smooth curve. After studying different fitting curves, the parabolic-fitting was determined to be the best in most cases. As shown in FIG. 10, the curve (cn) (running along the chin boundary between points M1 and M2), establishes a contour of the chin.

6. The contour of the cheek (FIG. 10). Straight lines (ck1, ck2) are used to connect T1 and M1, and T2 and M2, respectively. These straight line segments establish the left and right cheek contours, respectively. The chin contour and cheek contours make up the contour of the lower portion of the face. In most cases, this approach provides a good approximation of the user's face edge in the lower portion of the face.

7. Find forehead point F (FIG. 10). To find the forehead point, the iris areas are erased, otherwise some phony results will be obtained. So, a 50×50 pixel neighborhood of the left and right pupil centers is set to the background value (white). Then, a search begins upward from eye level along the centerline for the first black point. That point will be the forehead point F.

8. Find upper portion contour (FIG. 10). After the forehead point F is obtained, the region from eye level to F is searched line by line (1) in both horizontal and vertical directions (See FIG. 10). The first black points we meet toward left and right from the centerline and from eye level to the forehead are considered as the upper contour points f. The upper contour points define an upper contour fh of the user's face.

The user's face contour is the composite of the chin contour (cli), the left and right cheek contours (ck1,ck2), and the upper contour (fh), and is designated as the result, R(x,y)=cn+ck1+ck2+fh.

To properly classify the user's face contour, R(x,y) is compared to the industry standard face shapes. It has been discovered that the comparison should be done in the "frequency" domain rather than in the space (x,y) domain. R(x,y) is transformed into the frequency domain by using a 2-dimensional Fourier transformation. In the preferred embodiment, the Fourier transformation may be a cosine or sine transformation. From the transformation, the "frequency" spectrum of R(x,y) is obtained. Then, the corresponding frequency component in the user's face contour and the industry standard contours are compared to determine the best match. To save working memory, the 2D cosine transform was chosen to obtain the frequency spectrum of R(x,y). The equation for the discrete cosine transform is as follows:

$$D_1 = \sqrt{\frac{1}{M \cdot N} \sum_{1,j=0}^{(M-1)\cdot(N-1)} [F(m,n) - S_i(m,n)]^2}; \; i = 1, 2 \ldots S_T$$

To compare with standard face contours, $ST_i$, the frequency spectrum S(m,n) of those standards have been stored in the system's memory. Then the standard deviation $D_i$ is calculated by:

$$F(m,n) = \sum_{i=0}^{M-1} \sum_{j=0}^{N-1} R(i,j)\cos(i\pi m/M)\cos(j\pi n/N)$$

The best matching will be $j^{th}$ face contour, where $$D_1 = \text{Min}(D_1)$$

In most cases, the procedure above will provide accurate detection of the face shape. However, sometimes, the oval shape is very easy to be confused with other shapes. Therefore, some additional criteria are applied to avoid possible confusion. Those criteria are:

1. If abs(T1(x)−M1(x))<5, abs(T2(x)−M2(x))<5 and (M0(y)−P1(y))<2·(P1(y)−P(y)), the shape is considered square.

2. If abs(T1(x)−M1(x))<5, abs(T2(x)−M2(x))<5 and 0.9(P1(y)−F(y))<(M0(y)−P1(y))<1.1(P1(y)−F(y)), the shape is considered oblong.

3. If T1(x)>M0(x)+10 and T2(x)<M1(x)−10, the shape is considered triangle.

4. If point T1, T2, M1, M2 and C are on the periphery of a circle, the shape is considered round.

Where x and y stand for the coordinates of each point respectively. The numerical factors in the above criteria can be varied within the following ranges:

1. abs(T1(x)−M1(x))<2−8, abs(T2(x)−M2(x))<2−8 and (M0(y)−P1(y))<[1.8−2.2]·(P1(y)−F(y)). (Square).

2. abs(T1(x)−M1(x))<2−8, abs(T2(x)−M2(x))<2−8 and [0.8−1.2](P1(y)−F(y))<(M0(y)−P1(y))<[0.9−1.3](P1(y)−F(y)). (Oblong).

3. T1(x)>M0(x)+[7−13] and T2(x)<M1(x)−[7−13]. (Triangle).

4. Point T1, T2, M1, M2 and C are within 3 pixels inside or outside the periphery of the circle. (Round).

Figure 11:
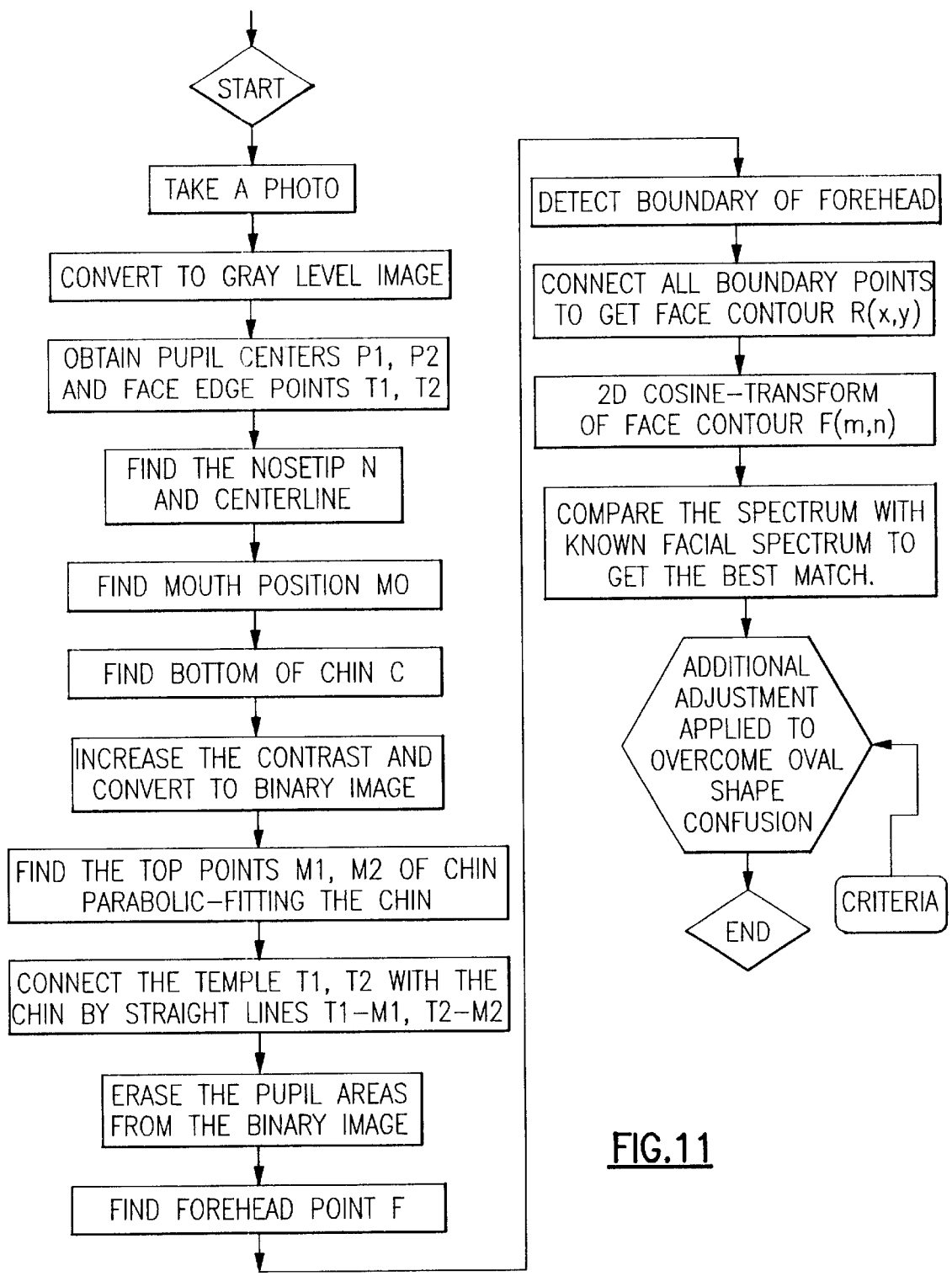
FIG. 11 is a flow diagram outlining the process by which the system in FIG. 1 automatically detects the shape of a person's face, from a digital image of the person's face.

The face shape detection process of the present invention is outlined in the flow diagram of FIG. 11.

Frame Image Pre-Processing

This section will describe the frame image pre-processing methods of the present invention, which are implemented in utility program 14 of system 10. The success of eyewear selection system depends on the quality of the frame images and the ability to provide a large number of such images to the user. The speed at which such frame images can be acquired and pre-processed for database storage is a key issue in being able to offer such an eyewear selection system. An algorithm to automatically process frame images is essential for a feasible system.

The core part of such an algorithm concerns how to remove the background of the frame image and reserve frame information needed to reproduce and superimpose the image. The boundary part of the frame is the key issue. If the frame boundary cannot be kept smooth, the frame will have a jagged (and thus fake) appearance in the composite image.

The frame preprocessing methods of the present invention address opaque, semi-transparent and transparent frames. The key is how to detect the frame boundary with high accuracy. First, the method of processing metal or non-transparent frames will be discussed. Of course, this method can be used for transparent frame, but with some reduction in accuracy.

Figure 12:
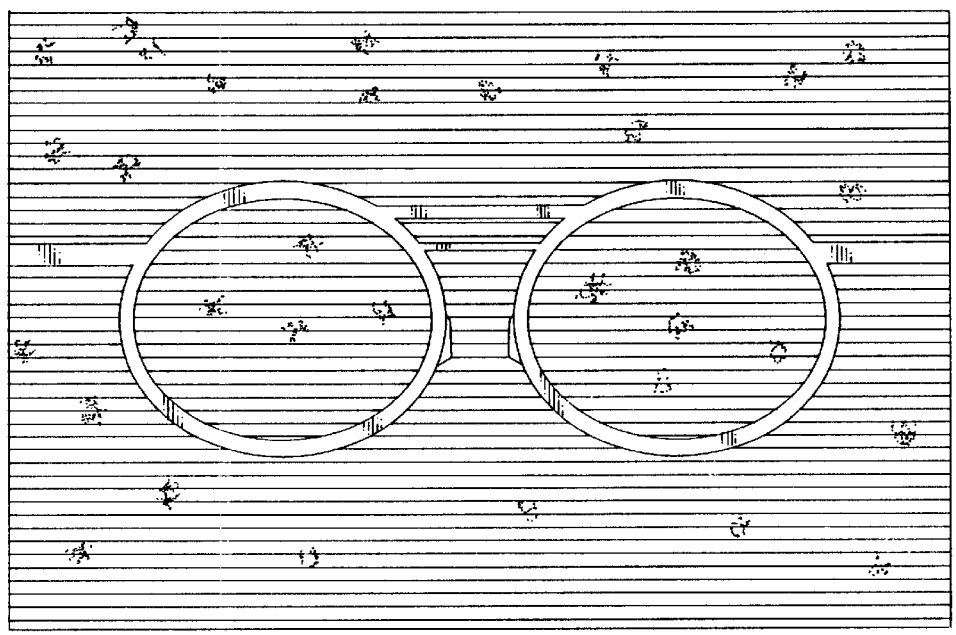
FIG. 12 is a drawing illustrating a digital frame image prior to pre-processing by the system shown in FIG. 1.

In this first method, the true color (24 bits) frame image (See FIG. 12) is converted to gray-level image by NTSC standard. This conversion is described under the Pupil Detection section of this description. To smooth the boundary of the frame, the image f(x,y) is averaged in a 3×3 window. The smoothed image is designated, $f_s(x,y)$. In order to distinguish the frame boundaries and remove the background, two edge detection operators $E_h$ and $E_v$ are applied to $f_s(x,y)$ in the horizontal and vertical directions. The resultant image in both directions will be:

$$F_h(x,y) = f_s(x,y) * E_h(x,y)$$

$$F_v(x,y) = f_s(x,y) * E_v(x,y)$$

where $$E_h = \begin{vmatrix} 1, & 2, & 1 \\ 0, & 0, & 0 \\ -1, & -2, & -1 \end{vmatrix} E_v = \begin{vmatrix} 1, & 0, & -1 \\ 2, & 0, & -2 \\ 1, & 0, & -1 \end{vmatrix}$$

*stands for convolution.

The final boundary image is represented by the equation $$E(x,y) = \text{Max}[F_h(x,y), F_v(x,y)].$$

For most regular frame images, the background is removed completely in the image E(x,y). Just the frame boundary information is kept. For further processing, we need to convert this gray level image E(x,y) to a binary one. Before this is done, linear mapping is employed to increase the contrast of E(x,y) (as described in Pupil Detection section). Then the binary image B(x,y) is created by:

$$B(x, y) = \begin{cases} 0; & \text{if } E(x, y) < 10 \\ 255; & \text{otherwise} \end{cases}$$

Figure 13:
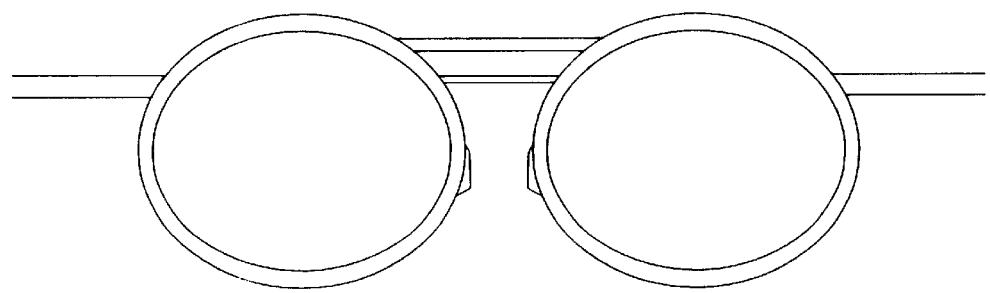
FIG. 13 is a drawing illustrating a digital binary image of a regular eyeglass frame.

In the binary image B(x,y), in the ideal case, only the frame boundary is represented by black. The background is removed and filled in with white color. This is true when processing most regular frames. FIG. 13 illustrates the binary image B(x,y) of a regular frame.

Now, for transparent frames, the binary image B(x,y) is obtained by another approach. Because of the transparency of the frame, some frame boundary color is very close to the background, in the full color 24-bit frame image. The edge detection operators given above are not powerful enough to handle this case. In this approach, the color image, rather than the gray-level image, is processed directly.

To remove the background in the "transparent" approach, we have to determine which color indicates the background. Pure color paper is used as background when taking the frame digital photographs. In the real world, the background will not be a single color, even if pure color paper is used. When using pure color paper, the background color in the resulting image will fall within a relatively narrow band of colors distributed around the paper color.

Another fact is that the background color occupies most of the area in the frame color image. Thus, the transparent frame approach assumes that the background color is the most frequently occurring color in the frame image. However, the statistics of the image cannot be practically obtained because a 24-bit true color image has more than 16 million colors. Therefore, a 256 color palette P is generated for the frame image. In accordance with palette P, we can convert the 24-bit color image to a 256-color pseudo image. It is possible to create a histogram for a 256-color image. During this conversion, the Microsoft Foundation Classes (MFC) library from Microsoft® is used.

According to the palette P, we can find the nearest index (i.e., palette color) in the palette for each pixel (r,g,b) value and generate a histogram H(i) for the index, in the usual fashion. Then, the (r,g,b) value corresponding to the most frequent index in the palette is considered as the background value b.

However, if the background is to be removed completely, the surrounding values of the background b must be taken into account. For this purpose, a new quantization value of (r,g,b) in the 24-bit image can be obtained, respectively, according to the following equation:

$$F_{r,g,b}(x,y) = \gamma_{r,g,b}(x,y) \cdot f_{r,g,b}(x,y) + (1 - \gamma_{r,g,b}(x,y)) \cdot b_{r,g,b}$$

where γ is the quantization coefficient, which is defined by $$\gamma_{r,g,b}(x,y) = abs[f_{r,g,b}(x,y) - b_{r,g,b}]/255$$

After this processing, the neighborhood (or band of) colors will be classified to the background b. Meanwhile, the foreground color stands out from the background.

By using the new image data $F_{r,g,b}$ and palette P, the frame image is converted into a 256 pseudo color image I(x,y). Then the following threshold is used to create the binary image B(x,y)

$$B(x, y) = \begin{cases} 255; & H(I(x, y)) > 800 \\ 0; & \text{otherwise} \end{cases}$$

Figure 14:
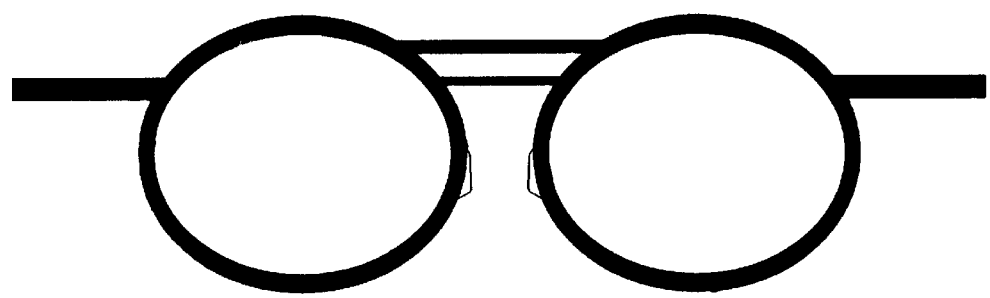
FIG. 14 is a drawing illustrating a digital binary image of a transparent eyeglass frame.
Figure 15:
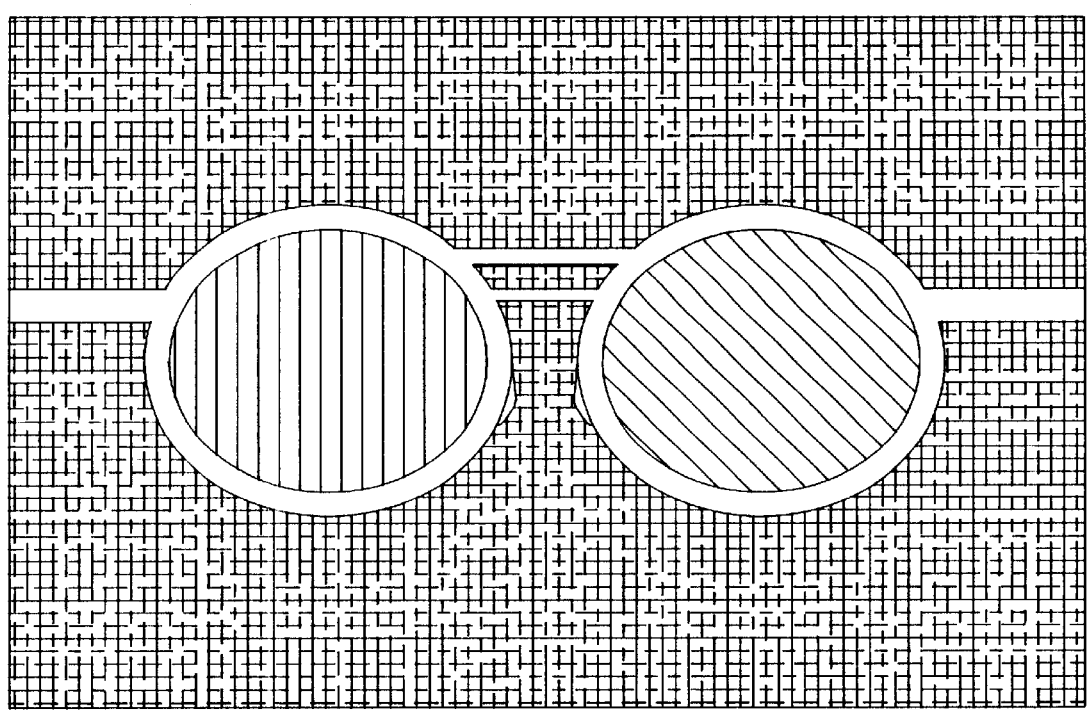
FIG. 15 is a drawing illustrating a color flood-filled image of an eyeglass frame, in accordance with the present invention.

The binary image for a transparent frame is illustrated in FIG. 14. After the binary image B(x,y) is obtained, for either the non-transparent and transparent frames, a new image N(x,y) is created in which the background is removed and the frame data are retained. A flood filling technique is used to fill different colors into specifically defined areas in image N(x,y). For example, as shown in FIG. 15, the left rim area of the frame is filled with red, the right rim area is filled with green, and the background is filled with yellow. The MFC Microsoft® library is employed to accomplish this flood filling technique. The unfilled area is reserved for the actual frame data. The pixel values are copied from the original color image f(x,y).

In order to flood fill an area, a starting point for each area must be identified. In the typical example shown in FIG. 15, four starting points are need for the left and right rims and upper and bottom background areas, respectively. The starting points can be determined by the following rules:

1. For the left rim:

$(x_1, y_1)$=(image width/4, image height/2)

2. For the right rim:

$(x_1,y_r)$=(image width·¾, image height/2)

3. For the upper background:

$(x_u,y_u)$=(image width/2, d/2), where d is the y-coordinate of the first black point in B(x,y) searching downwards along the centerline.

4. For the bottom background:

$(x_b,y_b)$=(image width/2, image width−10)

Upper and bottom background areas are considered separately because the temple portions of the frame divide the image into upper and lower portions.

5. For the double bridge case:

Another special case is double bridge frames, where an additional area exists between two bridges (See FIG. 15). We determine the starting point by:

$(x_d,y_d)$=(image width/2, $(d+d_1)/2$)

where $d_1$ is the y-coordinate of the first black point in B1(x,y) searching upwards along the centerline.

To support eyewear selection system 10, additional data from the frame image is necessary. For instance, to superimpose the frame on the face, the center point $f_c$ between the left and right rims is required (See "Superimposing Frame on Face" above). To calculate the frame temple lengths in the composite image, the starting points (Q1,Q2) of the temples in the frame image are needed. We will now describe how to obtain this data. It is assumed that the frame image has been processed and the different areas have been filled with a specified color, as in FIG. 15.

First, the rim centers $C_1=(x_1,y_1)$ and $C_2=(x_r,y_r)$ are calculated. Here, the center of the rim is defined as the centroid of the rim area (See FIG. 3). The following equation is applied to obtain the rim centers.

$$x_1 = \frac{\sum_{i,j \in red} i}{Area(i,j \in red)}; \quad y_1 = \frac{\sum_{i,j \in red} j}{Area(i,j \in red)};$$

$$x_r = \frac{\sum_{i,j \in green} i}{Area(i,j \in green)}; \quad y_r = \frac{\sum_{i,j \in green} j}{Area(i,j \in green)};$$

Then the center point is $$f_c(x,y)=[(x_l+x_r)/2, (y_l+y_r)/2]$$

The temple starting points Q1 and Q2 are determined by:

$$Q_1=Min(i)-15; \; i \in red$$

$$Q_2=Max(i)-15; \; i \in green$$

These frame data are shown in FIG. 3.

To create different sized frames from one frame image (to be described below), the bridge points B1 and B2 are necessary. They are calculated by the equations:

$$B_1=Max(i)+15; \; i \in red$$

$$B_2=Min(i)-15; \; i \in green$$

For frame measurements, the parameters d1 and d2 are needed. d1 and d2 are the distances between $f_c$ and the bottom of the rims, respectively. They are defined by the following expressions:

$$d_1=Max(j)-f_c(y); \; j \in red$$

$$d_2=Max(j)-f_c(y); \; j \in green$$

The temple segments L1 and L2 are also determined by the following expressions:

$$L_1=Q_1(x)-0=Q_1(x)$$

$$L_2=Image\;Width-Q_2(x)$$

Figure 16:
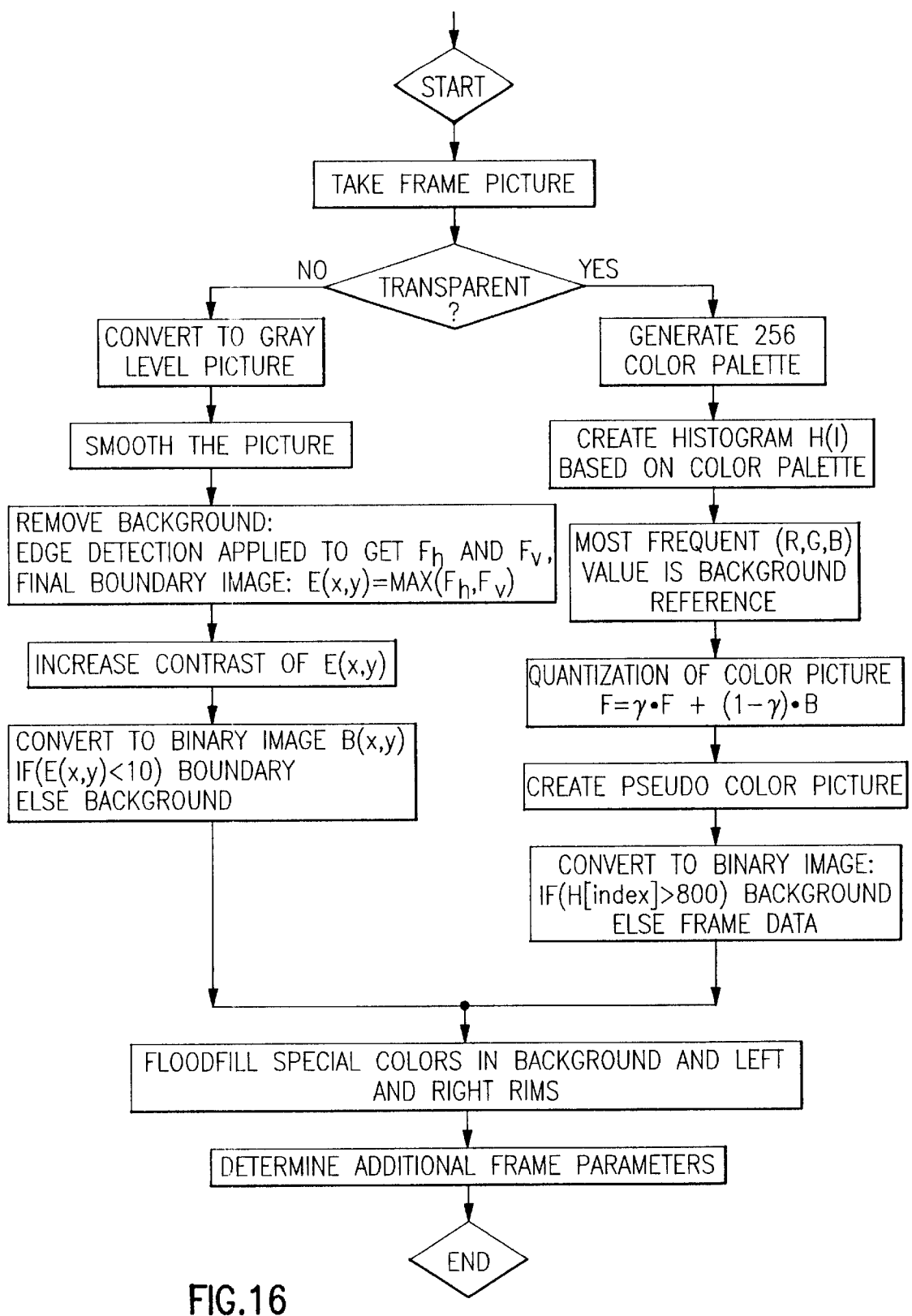
FIG. 16 is a flow diagram outlining the process by which the system in FIG. 1 pre-processes digital eyeglass frame images for storage in a frames database.

Thus, all of the necessary parameters are automatically obtained for eyewear selection system 10 (See FIG. 3). Once this data is obtained, it is recorded in database 16. The frame image processing methods of the present invention, as discussed above, are outlined in a flow diagram in FIG. 16.

Nosepad Processing

As mentioned above under the "Superimposition of Frame on Face" section of this description, the nosepad area of the frame requires special attention. Most nosepads are made from both transparent and opaque materials. The transparent area of the nosepad should be determined precisely and then processed. The non-transparent areas should be retained.

First, two full color digital photographs are taken, one of the frame with a pre-set background, f(x,y), and the other of the pre-set background without the frame, b(x,y). Both photographs are converted to gray level images, $f_g(x, y)$ and $b_g(x,y)$, in accordance with the NTSC standard. To save processing time and obtain a more accurate result, sub-images are extracted and processed. The sub-images, $S_f(x,y)$ and $S_b(x,y)$, are defined in the area:

$$w/4 \leq x \leq 3 \cdot w/4$$

$$h/4 \leq y \leq 3 \cdot h/4$$

where w is the width and 11 is the height of the image. In a neighborhood of 3×3 pixels, we statistic the difference between $S_f(x,y)$ and $S_b(x,y)$ by the following criteria:

$$c=c+1; \; if \; abs(S_f(x,y)-S_b(x,y))>20$$

where c is initialized to zero for each 3×3 window. According to the variable c, we can modify the original image f(x,y) by the following:

$$f(x,y)=N=(235,235,235); \; if \; f_g(x,y)>190 \; and \; c\neq 0$$

$$f(x,y)=f(x,y); \; otherwise$$

Here the color N=(235,235,235), is reserved and optimized to indicate the nosepad area. When we mount the frame on the face, the color N—representing the transparent area of the nosepad—is mixed with the skin tone of the face image, in accordance with the equation: nosepad=0.8·face+0.2·N.

Figure 17:
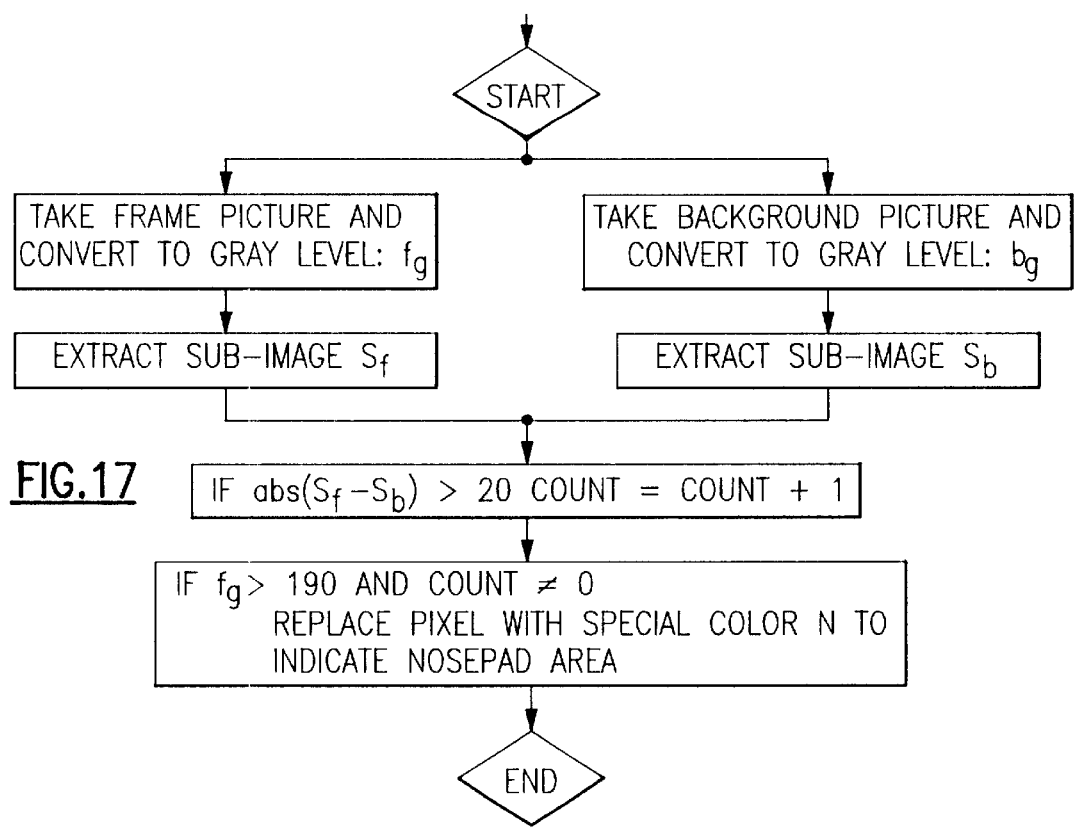
FIG. 17 is a flow diagram outlining the process by which the system in FIG. 1 pre-processes digital eyeglass frame images having a transparent or partially transparent nosepad.

The nosepad processing, as described herein, is outlined in the flow diagram of FIG. 17.

Blending Coefficient for Transparent Frames

As mentioned above, transparent frames also require special attention. Most transparent frames are not fully transparent. There are different degrees or percentages of transparency in different areas of a so-called transparent frame. When superimposing a "transparent" frame image onto a face image, the transparency percentage or variation must be taken into account, otherwise the composite image will not look real. Here, a method is described to determine a special blending coefficient, c(x,y), which will properly account for the distribution of transparency in a transparent frame image.

First, two full color digital photographs are taken, one of the frame with a pre-set background and the other of the pre-set background without a frame. Both photographs are converted to gray level images. Before the background image is converted to a gray level image, it is smoothed/averaged in a 5×5 pixel window. The gray level, smoothed background image is denoted $b_s(x,y)$, and the gray level frame image is denoted $f_g(x,y)$. The transparent blending coefficient c(x,y) can be calculated by the following equation:

$$c(x,y)=\frac{1}{5}\sqrt{\sum_{i,j=-2}^{2} ([f(x-i,y-j)-b_s(x-i,y-j)])^2}$$

To store the coefficient c(x,y) into a gray-level image, we have to normalize it by:

$$\overline{c(x,y)}=255 \cdot [c(x,y))-Min(c(x,y))]/[Max(c(x,y)-Min(c(x,y))]$$

When we superimpose a transparent frame on a face image, this coefficient is called from memory to accurately represent the transparent percentage at each point in the frame, in the composite image. The composite image for a transparent frame is determined by the following equation:

$$C(x,y) = [\overline{c(x,y)}/255] \cdot \text{face}(x,y) + [1 - \overline{c(x,y)}/255] \cdot \text{frame}(x,y).$$

Figure 18:
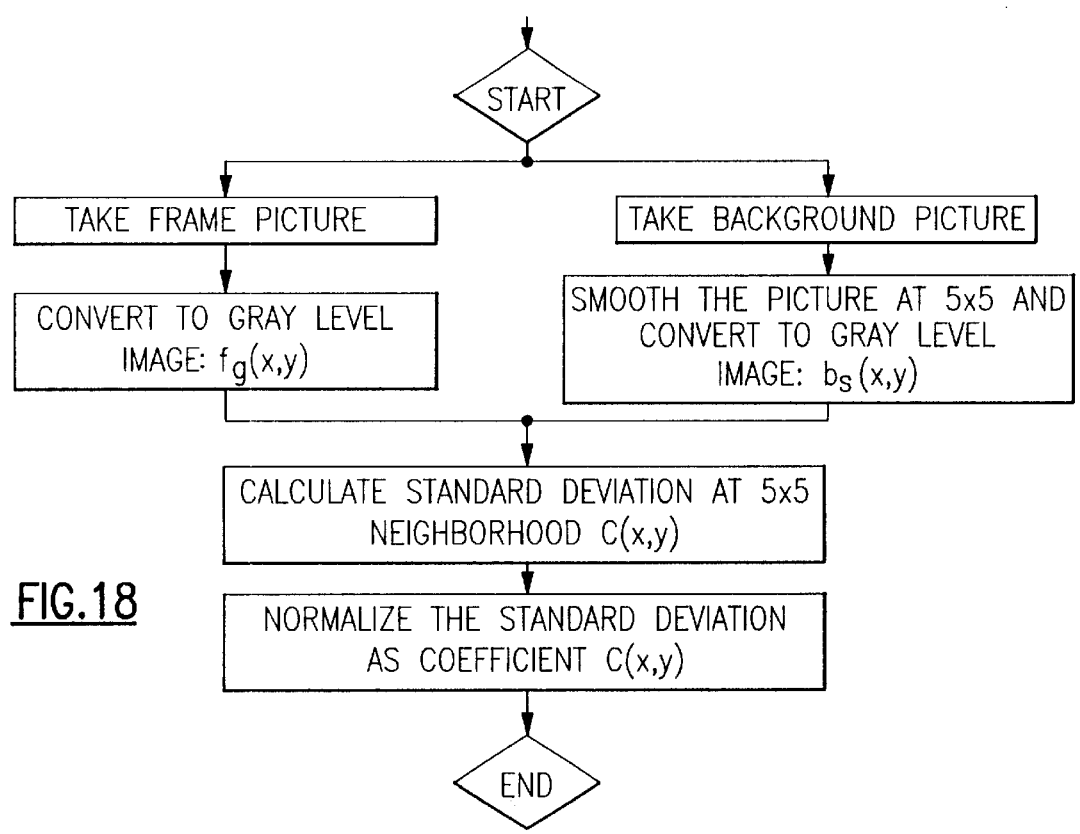
FIG. 18 is a flow diagram outlining the process by which the system in FIG. 1 determines a special transparency coefficient for representing varying degrees of transparency in a frame.

The process of determining the blending coefficient for transparent frames, as described herein, is outlined in the flow diagram of FIG. 18.

Re-sizing Frame Image

Normally one frame style has several sizes. If an image needs to be taken for each size of every style, database creation and size would become significant problems. To avoid such problems, a method was developed to manipulate one frame image to simulate different sizes.

The entire eyeglass frame does not vary proportionally from one size to another. Sometimes, only the rim size changes according to the size information. The bridge size may not change from one size to another. Therefore, one cannot simply scale one size up or down and achieve accurate results. The rim and bridge areas must be independently variable, so different scaling coefficients can be applied to those areas.

The rim size (EYE) and bridge size (DBL) are provided by the frame manufacturers. For example, if one style has three sizes, the middle size is selected for photographing. Then, from the frame processing, as described above, the bridge points $B_1$, $B_2$ and frame size Q1–Q2 are determined (FIG. 3). Then, the scale factors for the bridge and rim are calculated as follows:

$$\text{scale}_{rim} = (Q_2 - Q_1)/(2 \cdot \text{EYE} + \text{DBL})$$

$$\text{scale}_{bridge} = (B_2 - B_1)/\text{DBL}$$

Figure 19:
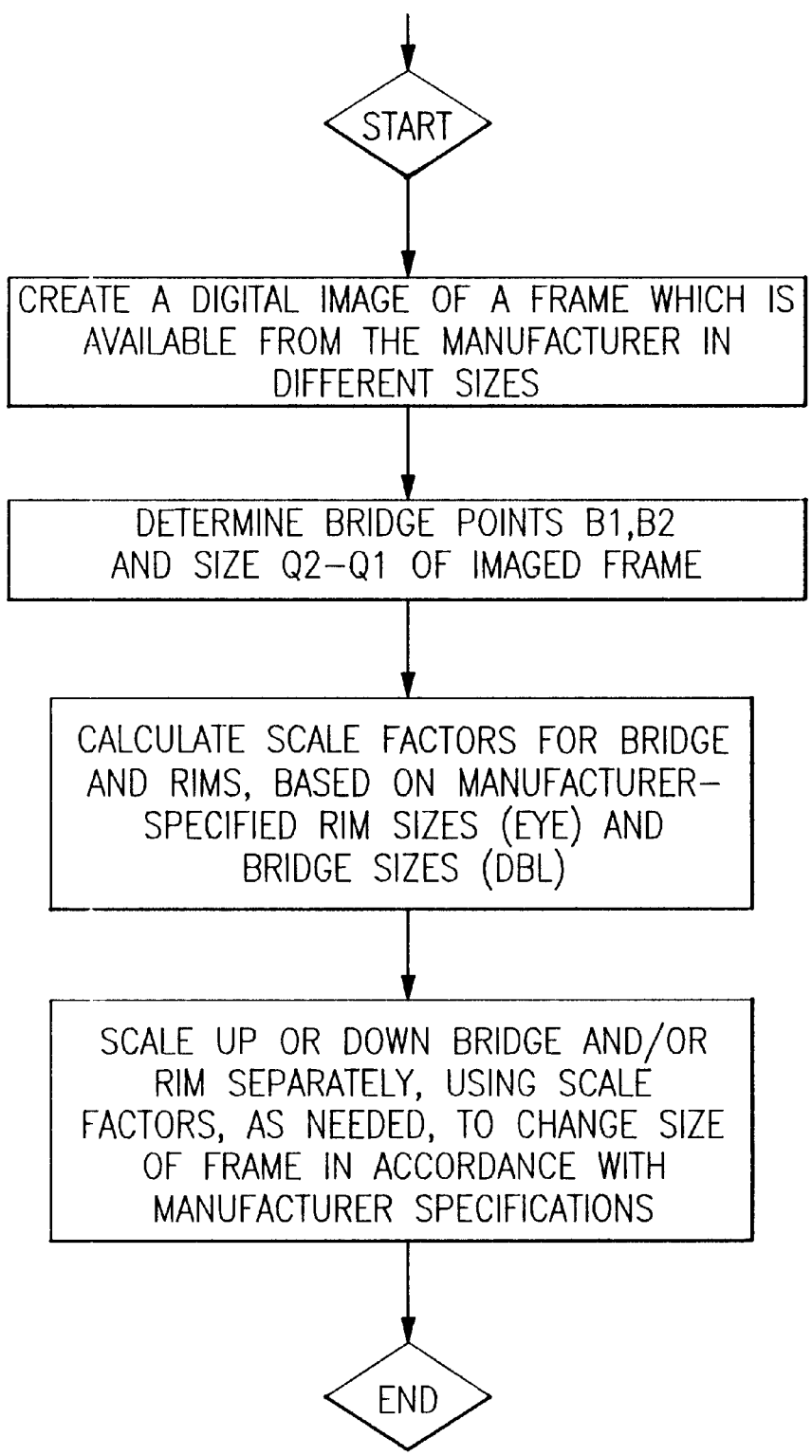
FIG. 19 is a flow diagram outlining the process by which the system in FIG. 1 automatically changes the size of a frame in accordance with the manufacturer's size specifications.

According to these scale factors, a regular image resize method can be employed to scale Lip or down the bridge and rims, separately. This processes is outlined in the flow diagram of FIG. 19. By employing this method, the time needed to create the frames database and the size of the database can be reduced by at least half to two-thirds.

Selecting Frames by SKU Numbers

In system 10, barcode scanner 30 (See FIG. 1) is used to read a barcode label affixed to an actual frame. The barcode label contains the SKU number and other unique data for that frame. A scanner program decodes the barcode to determine the particular SKU number. Frames database 16 is indexed by the SKU numbers of the frames stored therein. Thus, a particular frame image can be selected from database 16 by simply scanning in the SKU number or manually entering it through keyboard 28.

An optician's customer who has selected a particular frame from the optician's display board, can scan the SKU number into system 10 to select that particular frame from database 16. Once the customer's face image is acquired by system 10, the customer can view, on screen 26, how he or she looks wearing the selected frame. This method is particularly advantageous for those who have an extreme case of nearsightedness or astigmatism, and require their prescription lenses to view a frame. In other words, the system can he used as an advanced mirror.

Figure 20:
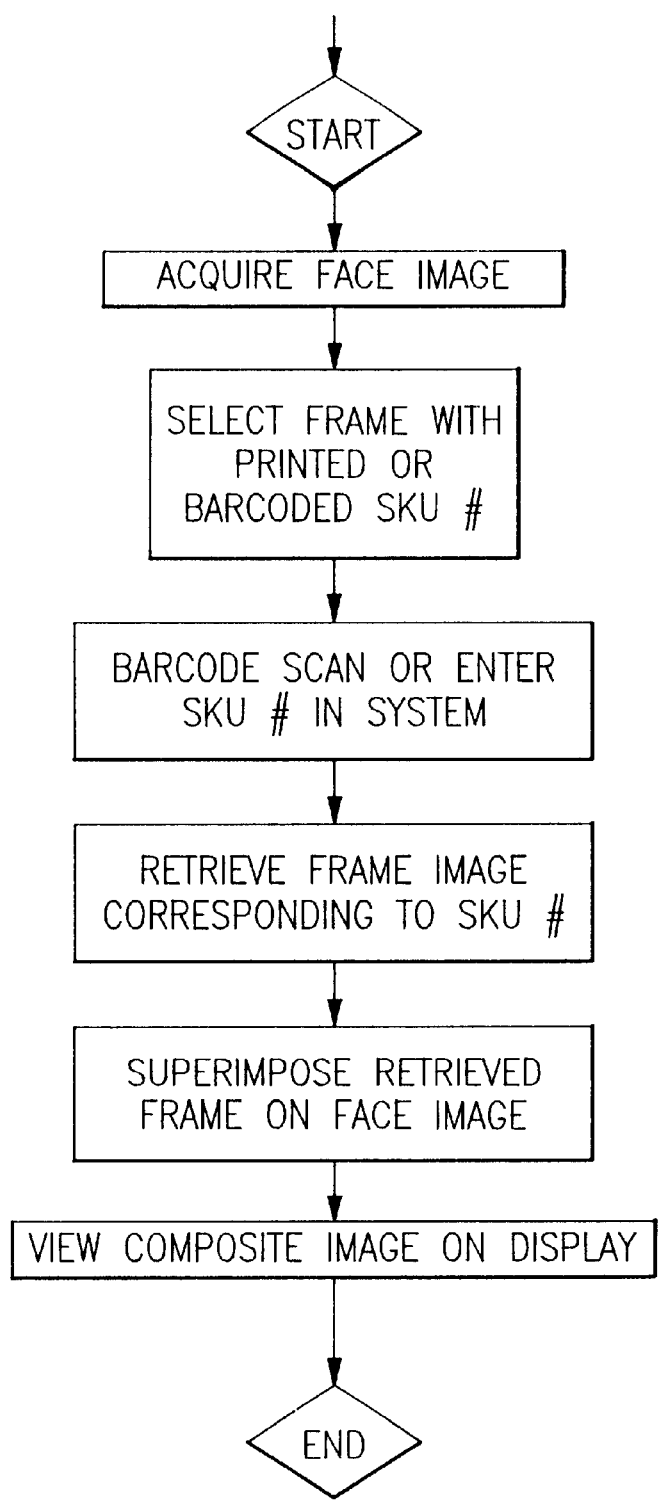
FIG. 20 is a flow diagram outlining the process by which the system in FIG. 1 automatically selects a frame image from the frames database based on a SKU At scanned in with a barcode scanner.

This method of selecting frames from system 10 is outlined in the flow diagram of FIG. 20.

Lens Simulation

System 10 also simulates the optical effects of eyeglass lenses installed in the frames. Thus, a customer's prescription can be entered into system 10, and the optical effects of this prescription can be simulated in the frame that appears in the composite image. Thus, the customer can consider the optical effects of the prescription in a particular frame before selecting that frame. Further, opticians can use the lens simulation techniques in system 10 to demonstrate to his/her customers various lens features and options.

System 10 includes a comprehensive simulation of lens optics and characteristics found in modern eyewear today. The system simulates prescriptions, lens weight and thickness, scratch coating and impact resistance, tint color, anti-reflection coating, and multi-focal lenses.

The system takes all standard eye exam prescriptions, such sphere, cylinder power and prisms. According to such data, the system calculates the lens curvatures and corresponding distortion on the naked eye area. For nearsighted or farsighted patients, a particular distortion parameter $\lambda$ is calculated according to their prescription. The image behind the lens area is enlarged or shrunk corresponding to this parameter $\lambda$. If bifocal or trifocal areas exist, different matching parameter $\lambda_1$ and $\lambda_2$ will be calculated. The image behind those areas is distorted according to those parameters.

According to standard optics equations and the customer's prescription, system 10 can calculate lens curvatures exactly. With known material density, the lens weight can be obtained and shown after the customer has selected a particular lens material. By using 3D graphic technology, a 3D view of the lens can be drawn, especially the edge thickness. This simulation will help the customer select lens material.

System 10 can simulate scratch resistant coatings. To simulate different degrees of scratching, the system mixes a pre-generated scratch pattern with the lens area, at a corresponding percentage. To simulate impact resistance, an animation was created. In the animation, a piece of lens is clamped by a clamp. While the clamp is screwed tighter and tighter, the lens will crack at certain degrees of pressure, corresponding to the lens material.

The system can simulate lens tint. Regular lenses can be tinted with different colors. To show the user the tint effect, the system blends some pre-generated color on the lens area. As the tint percentage varies, the blending coefficient will change correspondingly. Therefore, light and dark tints can be simulated. The same mechanism is used for a mirror tint. In a mirror tint, a pre-generated pattern is used instead of solid color. In a gradient color tint, the blending coefficient c(y) is linearly changed according to the following equation:

$$c(y) = (y_2 - y)/(y_2 - y_1)$$

where
  $y_1 = \text{Min}(y)$; $y \in$ lens area
  $y_2 = 2 \cdot \text{Max}(y)/3$; $y \in$ lens area The same mechanism is applied to a transition/photochromatic lens simulation performed by the system. The transition lens changes when indoors and outdoors (partially sunny and full sun) are simulated.

To simulate anti-reflection, a pre-generated reflection pattern is used to blend with the lens area in reflection cases. With an anti-reflection coating, the system simply ignores this pattern when creating the lens area image. The system displays a comparison, before and after anti-reflection coating. At the same time, the night driving benefit of anti-reflection coatings is simulated by viewing through the lens with and without anti-reflection coating.

In multi-focal simulations, certain patterns to describe multi-focal characteristics are pre-generated, such as executive bifocals and flat top bifocals. Since the seg-heights are calculated when determining frame parameters, the multi-focal patterns can be placed at the correct position on the lens, according to user's choice. At the same time, to show the optical effect at the multi-focal area, a slightly different blending coefficient c(y) value is used to mix lens and pattern, so that the multi-focal area is enhanced.

Contact Lens Simulation

System 10 also simulates contact lenses on the eyes. There are a few software packages on market today that simulate color contact lenses. However, the user must manually indicate or trace the boundaries of the irises before the contact lenses are simulated. This is very inconvenient for the user. System 10, on the other hand, automatically places the simulated contact lenses on the irises of the eyes in the face image. This can be done because system 10 performs automatic pupil center and iris radius detection on the face image.

Because the pupil center and iris radius are known, the system can define the iris area very well with this information. Also, the color of the contact lenses is pre-defined. Therefore, the key issue is how to blend the iris area with the pre-defined color for the selected contact lens. The data for the color contact lenses are extracted from samples of color contacts provided by manufacturers. The data are recorded in database 16.

Figure 21:
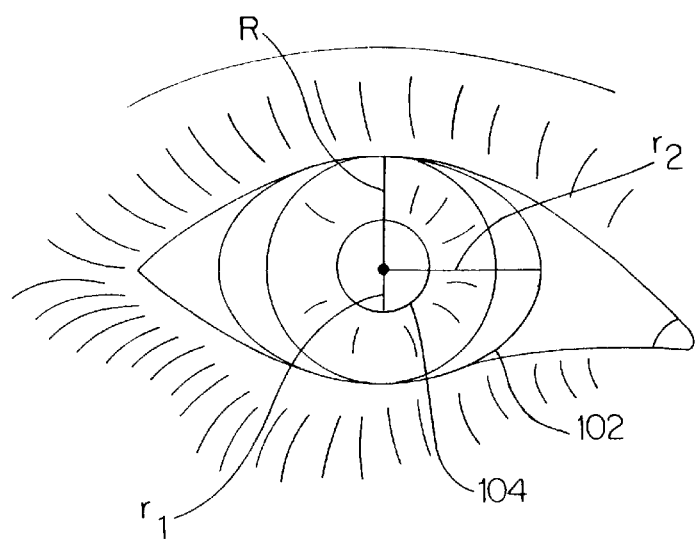
FIG. 21 is a drawing illustrating a digital image of an eye and the parameters used to simulate the superimposition of a contact lens on the eye.

Initially, a digital image of the user's face is acquired by system 10 in accordance with the present invention, as previously described. The pupil centers P1,P2 and iris radii R1,R2 are then detected in the user's face image, in accordance with the present invention as previously described. As shown in FIG. 21, an outside ellipse 102 and an inside circle 104 are defined at the eye areas, in the face image. Ellipse 102 surrounds the iris and establishes the outside boundary for the contact lens (i.e., contact lens color). The outside boundary is chosen to be an ellipse because most users will squint a little when their picture is taken by video camera 18. The squinting reaction causes the iris to elongate slightly and take on the shape of an ellipse. Therefore, an elliptical boundary provides a better simulation for the iris area than a circle. In the preferred embodiment, the ellipse for each eye is defined as a function of the iris radius R for that eye. In the preferred embodiment, the major radius $r_2$ of ellipse 102 (See FIG. 21) is chosen to be 1.4 times the iris radius R, i.e., $r_2=1.4 \cdot R$. The minor radius of ellipse 102 is chosen to be the iris radius R (See FIG. 21). In the preferred embodiment, the radius $r_1$ of inside circle 104 is chosen to be 0.4 times the iris radius R, i.e., $r_1=0.4 \cdot R$. As shown in FIG. 21, $r_1$ is chosen so that circle 104 bounds the pupil of the eye.

Figure 22:
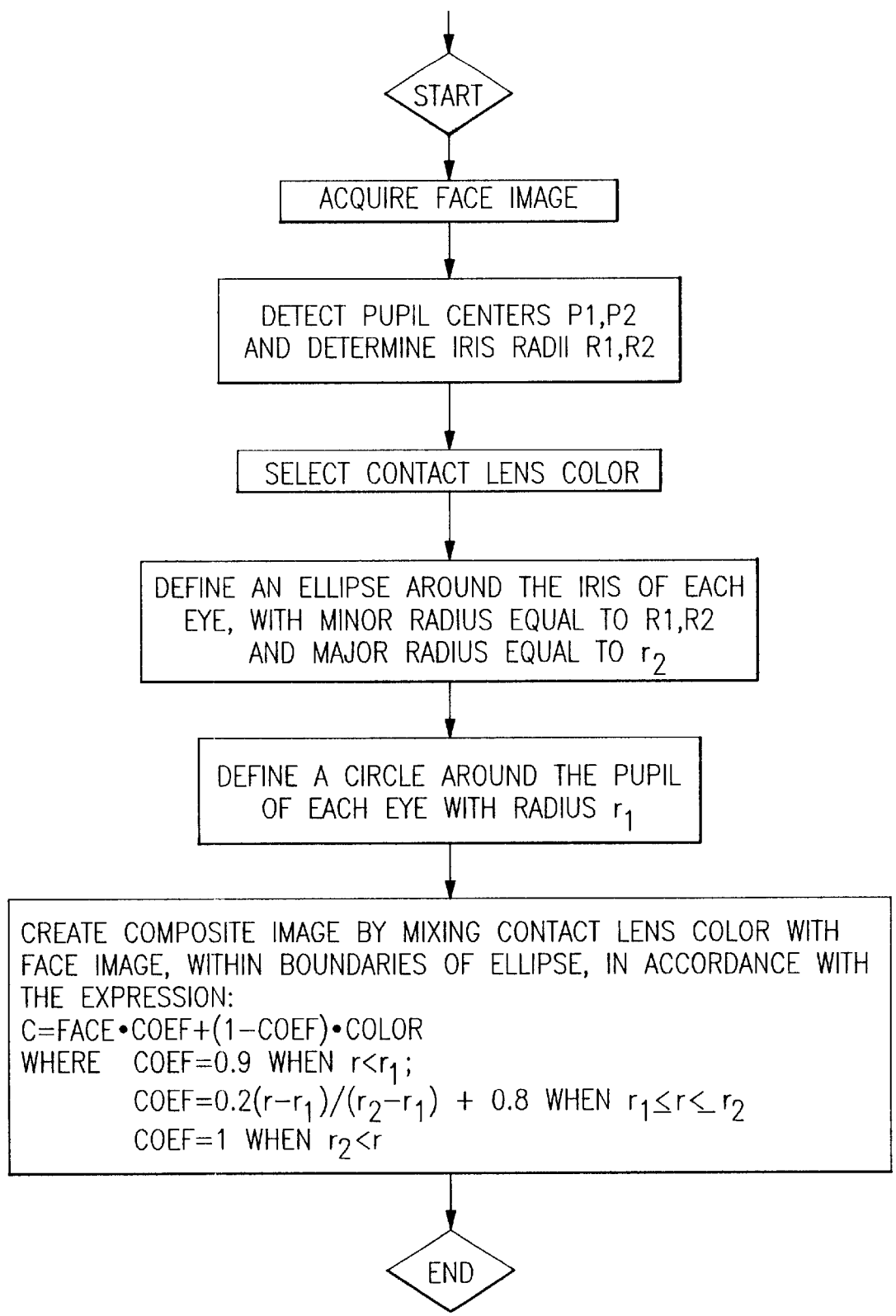
FIG. 22 is a flow diagram outlining the process by which the system in FIG. 1 simulates the superimposition of color contact lenses on the eyes, in a digital face image.

With these parameters defined, a composite image of the user's face image and the selected contact lens color is created. The composite image is created by mixing the contact lens color with the user's face image, within the boundaries of ellipse 102. In the preferred embodiment, the composite image is determined by the following equation:

Composite Image=face·coef+(1−coef)·color where coef is the mixing coefficient defined, for the preferred embodiment, as follows:

$$coef = \begin{cases} 0.9; & r < r_1 \\ 0.2(r-r_1)/(r2-1)+0.8; & r_1 \le r \le r_2 \\ 1; & r_2 < r \end{cases}$$

where $r_1=0.4R$; $r_2=1.4R$; and R is the iris radius. The blended image produced in accordance with the above will look natural. There is no color jump or any artifacts between the natural eye and contact lens (or dye) color. The contact lens simulation method of the present invention is outlined in the flow diagram of FIG. 22.

While the preferred embodiments of the invention have been particularly described in the specification and illustrated in the drawings, it should be understood that the invention is not so limited. Many modifications, equivalents and adaptations of the invention will become apparent to those skilled in the art without departing from the spirit and scope of the invention, as defined in the appended claims.

What we claim is:

1. A method of automatically determining eyeglass frame parameters from digital image of a person's face and a digital image of an eyeglass frame, said method comprising the steps of:
    (a) providing a digital image of the person's face, the face depicted in the face image containing left and right eyes with left and right irises, respectively;
    (b) determining a physical scale of the face in the face image;
    (c) locating a center point $P_1$ of the left iris of the face image, locating a center point $P_2$ of the right iris of the face image, and determining a pupil midpoint $P_c$ between the center points $P_1$ and $P_2$;
    (d) providing a digital image of an eyeglass frame, the frame depicted in the digital image having left and right frame rims;
    (e) adjusting, if necessary, the size of the frame of the frame image to the physical scale of the face of the face image;
    (f) combining the frame image with the face image to create a combined image, the combined image depicting the frame of the frame image superimposed on the face of the face image;
    (g) aligning the frame relative to the face in the combined image; and
    (h) determining the left and the right monocular PDs from the center points $P_1$ and $P_2$ and from the pupil midpoint $P_c$.

2. The method of claim 1, wherein the frame of the frame image imcludes a frame reference point located between the frame rims, and wherein said step (g) includes aligning the frame with the face in accordance with the frame reference point.

3. The method of claim 2, wherein the frame reference point is the midpoint $f_c$ between the frame rims, and wherein said step (g) includes aligning the frame with the face in accordance with the midpoint $f_c$ and the pupil midpoint $P_c$.

4. The method of claim 1, wherein the left and the right frame rims of the frame image contain first and second points, respectively, and wherein a first frame parameter $d_1$ is defined as the distance from the first point to the bottom of the left frame rim and wherein a second frame parameter $d_2$ is defined as the distance from the second point to the bottom of the right frame rim, said method further comprising the steps of:
    (i) determining the left and the right ocular centers from the first and the second frame parameters, $d_1$ and $d_2$, respectively.

5. The method of claim 4, wherein the first and the second points are the centroids of the left and the right rims, respectively.

6. The method of claim 4, further comprising the steps of:
(j) determining the radii of the left and the right irises of the face image; and
(k) determining the left and the right seg-heights from the radii of the left and the right irises, respectively, and from the first and the second frame parameters, $d_1$ and $d_2$, respectively.

7. The method of claim 6, further comprising the steps of:
(l) adjusting the position of the frame relative to the position of the face in the combined image by an adjustment factor, the monocular PDs, ocular centers, and seg-heights being adjusted in accordance with the adjustment factor.

8. The method of claim 7, wherein said step (1) includes automatically adjusting the position of the frame relative to the position of the face.

9. The method of claim 7, wherein said step (1) includes manually adjusting the position of the frame relative to position of the face.

10. A method of processing a digital eyeglass frame image which depicts an eyeglass frame having a nosepad, said method comprising the steps of:
(a) providing a first digital color image depicting the eyeglass frame in front of a first background;
(b) providing a second digital color image, the second image depicting a second background without the eyeglass frame;
(c) generating first and second gray level images from the first and the second digital color images, respectively, the first and the second gray level images each containing gray level pixel data, the pixel data of the first gray level image including eyeglass frame data and background data, the eyeglass frame data including nosepad data;
(d) determining the locations of the eyeglass frame data in the first gray level image by determining the difference between the pixel data of the first gray level image and the pixel data of the second gray level image and comparing the difference with a first threshold value;
(e) determining the locations of the nosepad data in the first gray level image by comparing the eyeglass frame data of the first gray level image to a second threshold value; and
(f) modifying the first digital color image by assigning a pre-determined color N to locations of the first color image that correspond to the locations of the nosepad data determined in said step.

11. The method of claim 10, wherein the first and the second backgrounds are the same pre-set background.

12. The method of claim 10, wherein the first gray level image is a sub-image of a gray level image of the first digital color image.

13. The method of claim 10, wherein the locations of the eyeglass frame data are those locations wherein the difference between the pixel data of the first and the second gray level images is greater than the first threshold value.

14. The method of claim 13, wherein the first threshold value is 20.

15. The method of claim 10, wherein the locations of the nosepad data are those locations where the eyeglass frame data is greater than the second thershold value.

16. The method of claim 15, wherein the second threshold value is 190.

17. The method of claim 10, further comprising the steps of:
(g) providing a third digital color image, the third image depicting a person's face;
(h) combining the first digital color image, as modified in said step (f), with the third image to create a combined color image, the combined image depicting the eyeglass frame superimposed naturally on the person's face; and
(i) mixing the pre-determined color N with the color of the person's face in the combined image where the nosepad of the eyeglass frame is depicted, such that the nosepad in the combined image appears at least partially transparent.

18. The method of claim 17, wherein the pre-determined color N is mixed with color of the face in accordance with the equation:

$$\text{nosepad} = 0.8 \cdot \text{face color} + 0.2 \cdot N.$$

19. A method of producing a blending coefficient for representing the degree of transparency in a transparent or semi-transparent eyeglass frame depicted in a digital image, said method comprising the steps of:
(a) providing a first digital color image, the first image depicting the eyeglass frame in front of a first background;
(b) providing a second digital color image, the second image depicting a second background without the eyeglass frame;
(c) generating first and second gray level images from the first and the second digital color images, respectively, the first and the second gray level images each containing gray level pixel data, the pixel data of the first gray level image including eyeglass frame data and background data;
(d) determining the difference between the pixel data of the first gray level image and the pixel data of the second gray level image; and
(e) determining the blending coefficient from the difference determined in said step (d).

20. The method of claim 19, wherein said step (d) includes determining the standard deviation between the pixel data of the first gray level image and the pixel data of the second gray level image; and wherein said step (e) includes determining the blending coefficient from said standard deviation.

21. The method of claim 19, further comprising the step of:
(f) smoothing the second digital color image before generating the second gray level image therefrom.

22. The method of claim 19, further comprising the step of:
(f) normalizing the blending coefficient.

23. The method of claim 22, further comprising the step of:
(g) storing the normalized blending coefficient in association with the first digital color image.

24. A method of producing a composite digital color image of a transparent or semi-transparent eyeglass frame superimposed on a person's face, using a blending coefficient, said method comprising the steps of:
(a) providing a first digital color image, the first image depicting a transparent or semi-transparent eyeglass frame;

(b) providing a blending coefficient associated with the first image;

(c) providing a second digital color image, the second image depicting a person's face;

(d) combining the first image with the second image to create a composite digital color image, the composite image depicting the eyeglass frame superimposed naturally on the person's face; and (e) in the composite image, blending the person's face with the eyeglass frame in accordance with the blending coefficient.

25. The method of claim 24, wherein the blending coefficient is normalized.

26. The method of claim 25, wherein said steps (d) and (e) are performed in accordance with the following equation:

$$C(x,y) = [\overline{c(x,y)}/255] \cdot \text{face}(x,y) + [1 - \overline{c(x,y)}/255] \cdot \text{frame}(x,y),$$

where $C(x,y)$ represents the composite image, $\overline{c(x,y)}$ represents the normalized blending coefficient, face $(x,y)$ represents the second image, and frame $(x,y)$ represents the first image.

27. A method of re-sizing an eyeglass frame depicted in a digital eyeglass frame image, said method comprising the steps of:

(a) providing a digital image of an eyeglass frame, the frame having a pair of rims and a bridge, the frame having a size Q2-Q1 and the bridge having a size B2-B1;

(b) employing a rim scaling factor which is a function of (i) the frame size Q2-Q1; (ii) a selected rim size EYE, and (iii) a selected bridge size DBL;

(c) employing a bridge scaling factor which is a function of the bridge size B2-B1 and the selected bridge size DBL; and (d) changing the size of the frame of the digital image by scaling the pair of rims and the bridge of the frame separately, if necessary, using the rim and the bridge scaling factors.

28. The method of claim 27, wherein the rim scaling factor is determined by the following equation:

$$(Q2-Q1)/(2 \cdot EYE+DBL),$$

and the bridge scaling factor is determined by the following equation:

$$(B2-B1)/DBL.$$

29. A method of stimulating color contact lenses on the eyes of a person depicted in a digital color image, said method comprising the steps of:

(a) providing a digital color image of a person's face, the face having a pair of eyes each containing an iris and a pupil;

(b) defining an outside area on each of the pair of eyes, the outside area surrounding the iris and having a boundary;

(c) defining an inside area on each of the pair of eyes, the inside area being located inside the outside area and having a boundary which substantially bounds the pupil;

(d) selecting a contact lens color; and (e) creating a composite digital color image of the person's face and the contact lens color, by mixing the contact lens color with the person's face within the boundary of the outside area, the proportion of the contact lens color to the person's face varying from a higher number at the boundary of the inside area to a lower number at the boundary of the outside area, whereby the contact lens color in the composite image simulates color contact lenses being worn naturally on the eyes of the person.

30. The method of claim 29, wherein the proportion of the contact lens color to the person's face is substantially constant within the boundary of the inside area.

31. The method of claim 29, wherein the composite image is created by the following equation:

$$\text{Composite Image} = \text{Coef} \cdot \text{face} + (1-\text{Coef}) \cdot \text{lens color},$$

where Coef is a mixing coefficient.

32. The method of claim 31, wherein the outside area has a radius $r_2$ and the inside area has a radius $r_1$, and wherein the mixing coefficient Coef is defined by the following equation:

$$\text{Coef}=0.9; \qquad r<r_1$$

$$\text{Coef}=0.2(r-r_1)/(r_2-r_1)+0.8; \qquad r_1 \leq r \leq r_2$$

$$\text{Coef}=1; \qquad r_2<r.$$

33. The method of claim 29, wherein the outside area on each eye is elliptically shaped and has a major radius $r_2$ kand a minor radius that is substantially equal to the radius of the iris.

34. The method of claim 33, wherein the major radius of the outside area on each eye is about 1.4 times the radius of the iris.

35. The method of claim 34, wherein the inside area on each eye is circular shaped and has a radius of about 0.4 times the radius of the iris.

36. The method of claim 29, further comprising the steps of:

(f) detecting the centers of the irises of the pair of eyes, the outside and the inside areas on one of the pair of eyes is substantially centered at the center of the iris of the one eye, and the outside and the inside areas of the other one of the pair of eyes is substantially centered at the center of the iris of the other eye; and (g) determining the radii of the irises of the one and the other eyes, the outside and the inside areas on the one eye having radii that are a function of the iris radius of the one eye, and the outside and the inside areas of the other eye having radii that are a function of the iris radius of the other eye.

* * * * *

UNITED STATES PATENT AND TRADEMARK OFFICE
CERTIFICATE OF CORRECTION

PATENT NO. : 6,508,553 B2
DATED : January 21, 2003
INVENTOR(S) : Feng Gao et al.

It is certified that error appears in the above-identified patent and that said Letters Patent is hereby corrected as shown below:

Column 20,
Line 65, "$\overline{c(x,y)} = 255 \cdot [c(x,y)) - Min\ (c(x,y))] / [Max\ (c(x,y)) - Min\ (c(x,y))]$" should read -- $\overline{c(x,y)} = 255 \cdot [c(x,y) - Min\ (c(x,y))] / [Max\ (c(x,y)) - Min\ (c(x,y))]$ --

Column 24,
Line 27, "in" should read -- of --
Lines 29-30, "face image" should read -- face --
Line 31, "face image," should read -- face --
Line 49, "imcludes" should read -- includes --
Line 64, "steps" should read -- step --

Column 25,
Line 11, "steps" should read -- step --
Line 26, "image depicting" should read -- image, the first image depicting --
Line 51, "step." should read -- step (e). --

Column 26,
Line 7, "color image" should read -- digital color image --

Column 27,
Line 18, "$C(x, y) = [\overline{c(x,y)}/255] \cdot face\ (x,y) + ]1 - \overline{c(x,y)}/255] \cdot frame\ (x,y),$" should read -- $C(x, y) = [c(x,y)/255] \cdot face\ (x,y) + [1 - c(x,y)/255] \cdot frame\ (x,y),$ --
Line 33, "Q2-Q1;" should read -- Q2-Q1, --

Column 28,
Line 35, "Coef = 1;    $r_{2 < r}$," should read -- Coef = 1;   $r_2 < r$ --
Line 38, "kand" should read -- and --

Signed and Sealed this

Second Day of September, 2003

JAMES E. ROGAN
*Director of the United States Patent and Trademark Office*